US012142781B2

(12) United States Patent
Wiegman

(10) Patent No.: US 12,142,781 B2
(45) Date of Patent: *Nov. 12, 2024

(54) SYSTEMS AND METHODS FOR REDUNDANT ELECTRIC POWER FOR AN ELECTRIC AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/217,542

(22) Filed: Jul. 1, 2023

(65) Prior Publication Data

US 2023/0352791 A1  Nov. 2, 2023

Related U.S. Application Data

(63) Continuation of application No. 17/878,006, filed on Jul. 31, 2022, now Pat. No. 11,742,546, which is a (Continued)

(51) Int. Cl.
*B60L 50/64* (2019.01)
*B60L 3/00* (2019.01)
(Continued)

(52) U.S. Cl.
CPC ........ *H01M 50/249* (2021.01); *B60L 3/0046* (2013.01); *B60L 50/64* (2019.02);
(Continued)

(58) Field of Classification Search
None
See application file for complete search history.

(56) References Cited

U.S. PATENT DOCUMENTS 6,060,141 A    5/2000   Harvey
9,787,948 B2  10/2017   De Carvalho
(Continued)

OTHER PUBLICATIONS

Andrea, Davide, Lithium-Ion Batteries and Applications—A Practical and Comprehensive Guide to Lithium-Ion Batteries and Arrays, from Toys to Town, Artech House, Norwood, MA, 2020, pp. 245-246, 331-334, and 517.
(Continued)

*Primary Examiner* — Roy Y Yi
(74) *Attorney, Agent, or Firm* — Lee & Hayes, P.C.

(57) ABSTRACT

A system and method for redundant electric power for an electric aircraft is provided. The system includes a plurality of battery packs which includes at least a first pack monitor unit and at least a second pack monitor unit configured to detect a first battery pack datum and a second battery pack datum and transmit the pair of battery pack datum to a controller. Each battery pack. The system further includes a contactor coupled to the electric aircraft, a plurality of loads communicatively coupled to each battery pack of the plurality of battery packs, and a controller, wherein the controller is designed and configured to receive the first battery pack and the second battery pack datum, compare the first battery pack datum to the second battery pack datum as a function of a differential threshold, and generate an alert datum as a function of the comparison.

20 Claims, 14 Drawing Sheets

Related U.S. Application Data continuation of application No. 17/479,828, filed on Sep. 20, 2021, now Pat. No. 11,469,473.

(51) Int. Cl.
*B60L 50/60* (2019.01)
*H01M 10/48* (2006.01)
*H01M 50/249* (2021.01)

(52) U.S. Cl.
CPC ............. *B60L 50/66* (2019.02); *H01M 10/48* (2013.01); *H01M 2220/20* (2013.01)

(56) References Cited

U.S. PATENT DOCUMENTS

| | | | |
|---|---|---|---|
| 11,235,853 | B2 | 2/2022 | Pelletier |
| 11,469,473 | B1 * | 10/2022 | Wiegman .................. B60L 3/12 |
| 11,742,546 | B2 * | 8/2023 | Wiegman ................ B60L 58/21 |
| | | | 180/68.5 |
| 2005/0185352 | A1 | 8/2005 | Nguyen |
| 2015/0029902 | A1 | 1/2015 | Tischler et al. |
| 2018/0233007 | A1 | 8/2018 | Williams |
| 2018/0287398 | A1 | 10/2018 | Melack |
| 2021/0339882 | A1 | 11/2021 | Ferrier et al. |
| 2022/0269291 | A1 | 8/2022 | Teles Ferreira et al. |

OTHER PUBLICATIONS

"False Canopy: Here's Why a Fake Canopy Painted On Underside of Fighter Jets," Fighter Jets World, Nov. 10, 2022 <<https://fighterjetsworld.com/air/false-canopy-heres-why-a-fake-canopy-painted-on-underside-of-fighter-jets/18172/>>, retrieved on Jun. 25, 2024, 4 pages.

Office Action for U.S. Appl. No. 17/878,006, mailed on Nov. 10, 2022, Wiegman, "Systems and Methods for Redundant Electric Power for an Electric Aircraft", 14 pages.

Office Action for U.S. Appl. No. 17/479,828, mailed on Mar. 29, 2022, Wiegman, "Systems and Methods for Redundant Electric Power for an Electric Aircraft", 11 pages.

Search Report and Written Opinion for International Application No. PCT/US2024/011497, mailed May 23, 2024, 14 pages.

\* cited by examiner

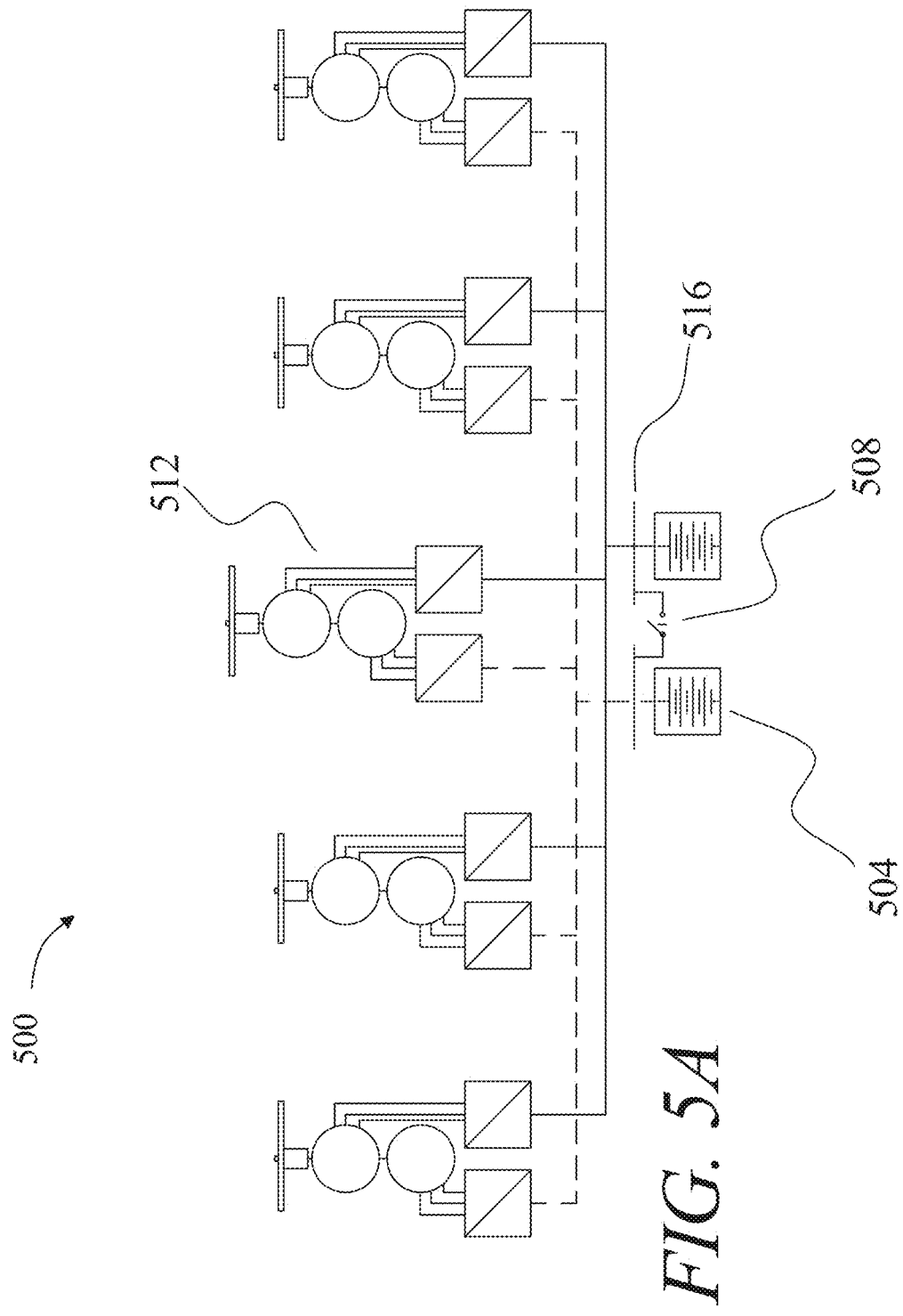

SYSTEMS AND METHODS FOR REDUNDANT ELECTRIC POWER FOR AN ELECTRIC AIRCRAFT

CROSS-REFERENCE TO RELATED APPLICATIONS

This application is a continuation of Non-provisional application Ser. No. 17/878,006, filed on Jul. 31, 2022, and entitled "SYSTEMS AND METHODS FOR REDUNDANT ELECTRIC POWER FOR AN ELECTRIC AIRCRAFT," which is a continuation of Non-provisional application Ser. No. 17/479,828, filed on Sep. 20, 2021, and entitled "SYSTEMS AND METHODS FOR REDUNDANT ELECTRIC POWER FOR AN ELECTRIC AIRCRAFT," the entirety of which are incorporated herein by reference.

FIELD OF THE INVENTION

The present invention generally relates to the field of electric power. In particular, the present invention is directed to systems and methods for redundant electric power for an electric aircraft.

BACKGROUND

In electric aircraft operations, the complexity of the various systems result in each system being heavily reliant on each other. In an electric aircraft, a fault or failure of an electrical energy source of an electric system may pose a significant threat to the safety of the electric aircraft and its cargo. The operation of a multitude of electrical subsystems of an electric aircraft may be at risk at a fault or failure of an electrical energy source of an electric aircraft. A system to mitigate the inconsistent power output of an electrical energy source may be desired.

SUMMARY OF THE DISCLOSURE

In an aspect, a system for redundant electric power for an electric aircraft wherein the system includes a battery pack, wherein the battery pack includes, at least a first pack monitor unit, wherein the at least a first pack monitor unit includes a first a first sensor suite, wherein the at least a first pack monitor unit is configured to detect a first battery pack datum of the battery pack as a function of the first sensor suite, at least a second pack monitor unit, wherein the at least a second pack monitor unit includes a second sensor suite wherein the at least a second pack monitor unit is configured to detect a second battery pack datum of the battery pack as a function of the second sensor suite, a battery management system, wherein the battery management system is configured to receive the first battery pack datum from the at least a first pack monitor unit, receive the second battery pack datum from the at least a second pack monitor unit, receive a differential threshold from the battery management system and compare the first battery pack datum to the second battery pack datum as a function of the differential threshold, and a contactor coupled to the electric aircraft, and at least a load electrically coupled to the battery pack.

In another aspect, a method for redundant electric power for an electric aircraft includes detecting a first battery pack datum of a battery pack by at least a first pack monitor unit having a first sensor suite and a second battery pack datum of the battery pack by at least a second pack monitor unit having a second sensor suite, receiving, by a battery management system, the first battery pack datum from the at least a first battery pack monitor and the second battery pack datum from the at least a second pack monitor unit, receiving, by the battery management system, a differential threshold, and comparing the first battery pack datum to the second battery pack datum as a function of a differential threshold.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5A is a schematic diagram of an exemplary embodiment of a system for dynamic excitation of an energy storage element configured for use in an electric aircraft;

Figure 1:
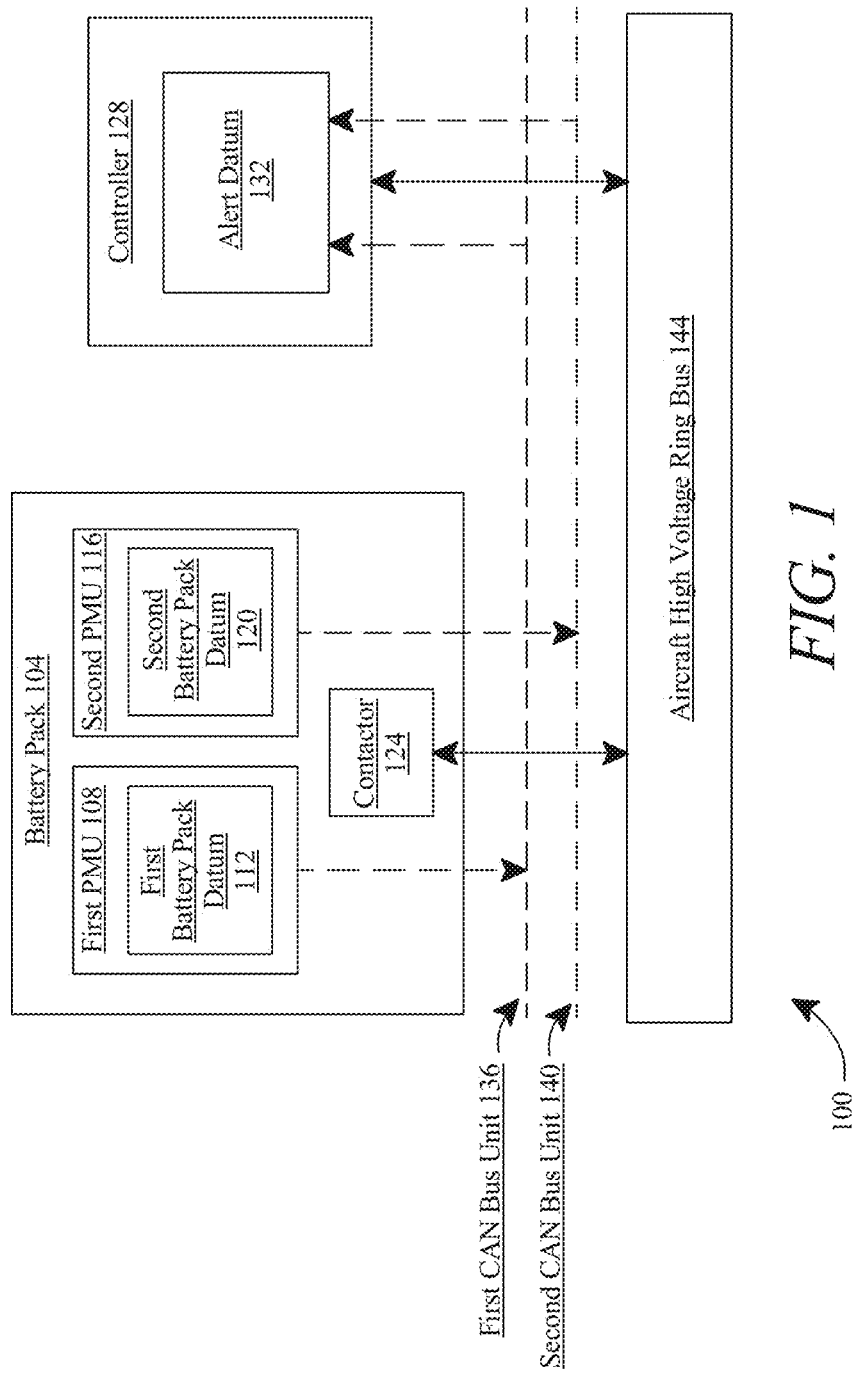
FIG. 1 is a block diagram of an exemplary embodiment of a system for redundant electric power.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for redundant electric power. In an embodiment, aspects of the present disclosure may be used to continuously power and operate an electric aircraft in the occurrence of a failure or fault of a battery pack of the electric aircraft's power source. Each battery pack or a group of battery packs may include the capability to compensate for the failure of another battery pack or another group of battery packs. Aspects of the present disclosure can be used to extend the life cycle of individual battery packs.

Aspects of the present disclosure can also be used to shut down hazardous battery packs without interrupting the operation of an electric aircraft. Aspects of the present disclosure can also be used to ensure charge does not travel from one battery to another battery in a parallel configuration. Aspects of the present disclosure can also be used to ensure charge does not travel from one battery to another battery in a series configured. Aspects of the present disclosure can also be used to utilize high voltage batteries and detect irregularities in various redundant architectures. Aspects of the present disclosure allow for a security measure in the case of a failure or fault of a battery pack. Exemplary embodiments illustrating aspects of the present disclosure are described below in the context of several specific examples.

Referring now to FIG. 1, a block diagram of an exemplary embodiment of a system 100 for redundant electric power is illustrated. The system includes a battery pack of a plurality of battery packs. A "battery pack," for the purpose of this disclosure, is a set of any number of individual battery modules or identical battery modules. Battery pack 104 may include a plurality of battery cells. Battery pack 104 may include a plurality of electrochemical cells. In a non-limiting embodiment, battery pack 104 may be configured to deliver electrical power to a plurality of electrical systems of an electric aircraft. In a non-limiting embodiment, each battery pack 104 of the plurality of battery packs may work in tandem to provide electrical energy to a plurality of electrical systems of an electric aircraft. For example and without limitation, battery pack 104 may be used to power a flight component or a set of flight components. For example and without limitation, each battery pack 104 may be used to power unique flight components or a unique set of flight components. A "flight component," for the purposes of this disclosure, is any component related to, and mechanically connected to an aircraft that manipulates a fluid medium in order to propel and maneuver the aircraft through the fluid medium. Battery pack 104 may include a battery management system integrated into the battery pack. For instance and without limitation, battery management system may be consistent with the disclosure of any battery management system in U.S. patent application Ser. No. 17/108,798 and title SYSTEMS AND METHODS FOR A BATTERY MANAGEMENT SYSTEM INTEGRATED IN A BATTERY PACK CONFIGURED FOR USE IN ELECTRIC AIRCRAFT," which is incorporated herein by reference in its entirety. Persons skilled in the art, upon reviewing the entirety of this disclosure, will be aware of the various flight components that may represent battery pack 104 consistently with this disclosure.

With continued reference to FIG. 1, battery pack 104 may include a plurality of battery cells aligned in a parallel configuration. In a non-limiting embodiment, the plurality of battery cells may be configured to increase the capacity of the overall assembly of the battery cells in the battery pack 104. In a non-limiting embodiment, battery cells may include a plurality of diodes. In a non-limiting embodiment, a parallel configuration of battery cells may be configured to prevent a power output exceeding the standard voltage output of the battery cells. In a non-limiting embodiment, a parallel configuration may produce a consistent power output in the event of a failure of at least one battery pack 104 to produce a constant voltage. In a non-limiting embodiment, parallel batteries may each be connected to a charger. In some embodiments, each battery comprises its own independent charger. In some embodiments, a single charger charges all the batteries. A parallel battery, for the purposes of the invention, describes an entire battery that connects a load of the aircraft and an electrical ground. A parallel battery may comprise a plurality of batteries or battery cells. A parallel battery may comprise multiple batteries both arranged in series and in parallel. The multiple batteries may be installed on a plurality of battery management boards. For example, one parallel battery may comprise twelve battery management boards and batteries. In a non-limiting embodiment, a management system may be present for each parallel battery. For example and without limitation, the management system may check cell voltages, capacities, or any appropriate battery measurement. For example and without limitation, in the event of an irregularity, an alert may be sent to a pilot, an error may be logged, the battery may be deactivated, or any appropriate action may be taken. Battery pack 104 may include a plurality of battery cells aligned in a series configuration. In a non-limiting embodiment, the plurality of battery cells may include a positive terminal of a first battery cell to be connected to a negative terminal of a second battery and so on, until the desired voltage is reached, and the final voltage is the sum of all battery voltages added together while the final amp-hours remains unchanged. In a non-limiting embodiment, each battery cell may be configured to increase its power output in the event of a failure of another battery cell in the series configuration to satisfy the voltage capacities of the battery cells connected in series. In a non-limiting embodiment, an electrical load may be configured to consume a reducing amount of electric power to allow for a series and/or parallel configuration to satisfy their voltage requirements. Persons skilled in the art, upon reviewing the entirety of this disclosure, will be aware of the various embodiments in maintaining power output of a series and/or parallel configuration consistent with this disclosure.

With continued reference to FIG. 1, battery pack 104 includes at least a first pack monitor unit (PMU) and at least a second pack monitor unit. A "first pack monitor unit," for the purpose of this disclosure, is a device configured to capture information regarding a battery pack. A "second pack monitor unit," for the purpose of this disclosure, is a device configured to capture information regarding a battery pack. In a non-limiting embodiment, first PMU 108 and second PMU 116 may be identical. In a non-limiting embodiment, second PMU 116 may be configured to detect data after first PMU 108. First pack monitor unit 108 and/or second pack monitor unit 116 may include a microcontroller. The first pack monitor unit 108 and/or second pack monitor unit 116 may include a sensor. A "sensor," for the purposes of this disclosure, is an electronic device configured to detect, capture, measure, or combination thereof, a plurality of external and electric vehicle component quantities. Sensor may be integrated and/or connected to at least an actuator, a portion thereof, or any subcomponent thereof. Sensor may include a photodiode configured to convert light, heat, electromagnetic elements, and the like thereof, into electrical current for further analysis and/or manipulation. Sensor may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. First pack monitor unit 108 may include a first sensor suite. First sensor suite may include a plurality of individual sensors. Second pack monitor unit 116 may include a second sensor suite. Second sensor suite may include a plurality of individual sensors. In a non-limiting embodiment, first sensor suite may be identical to the second sensor suite. First pack monitor unit 108 and/or second pack monitor unit 116 may include a temperature sensor, digital temperature sensor, temperature probe, thermistors, thermocouples, and the like thereof. A "temperature sensor," for the purposes of this disclosure, is a device that detects and measure hotness and coolness of a battery pack 104 and converts it into electrical signals. First pack monitor unit 108 and/or second pack monitor unit 116 may include an isolated controller area network (CAN) transceiver, a pressure sensor, a humidity sensor, an accelerometer, an inertial measurement unit (IMU) a switching regulator, a serial peripheral interface (SPI), and the like thereof. In a non-limiting embodiment, first pack monitor unit 108 may be identical to second pack monitor unit 116. In a non-limiting embodiment, first pack monitor unit 108 and second pack monitor unit 116 may be configured to measure identical targets. In a non-limiting embodiment, the at least first pack monitor unit may measure a different datum of a target than the at least a second monitor unit may measure. In a non-limiting embodiment, first pack monitor unit 108 and/or second pack monitor unit 116 may be used to double check measuring of datum. In a non-limiting embodiment, first PMU 108 may be configured to detect first battery pack datum 112 initially and second PMU 116 may be configured to detect a second battery pack datum 120 after a time interval and/or buffer. For example and without limitation, second PMU 116 may be configured to begin detecting a second battery pack datum 120 ten nanoseconds after first PMU 108 detects the first battery pack datum 120. For example and without limitation, second PMU 116 may be configured to begin detecting a second battery pack datum 120 sixty seconds after first PMU 108 detects the first battery pack datum 120. Persons skilled in the art, upon reviewing the entirety of this disclosure, will be aware of the various purposes of detecting with a time buffer consistent with this disclosure.

With continued reference to FIG. 1, first PMU 108 is configured to detect first battery pack datum 112. Second PMU 116 is configured to detect a second battery pack datum 120. A "first battery pack datum," for the purpose of this disclosure, is an element of data representing physical attributes of a battery pack. A "second battery pack datum," for the purposes of this disclosure, is an element of data representing physical attributes of a battery pack. In a non-limiting embodiment, first battery pack datum 112 and second battery pack datum 120 may be identical. In a non-limiting embodiment, second battery pack datum 120 may be detected after first battery pack datum 112. First battery pack datum 112 and/or second battery pack datum 120 may include an identical datum of information. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor may include circuitry, computing devices, electronic components or a combination thereof that translates into at least an electronic signal configured to be transmitted to another electronic component. First battery pack datum 112 and/or second battery pack datum 120 may include identification numbers for a battery pack unit 104 of a plurality of battery pack units. In a non-limiting embodiment, controller 128 may assign first battery pack datum 112 and/or second battery pack datum 120 to a unique battery pack unit 104. First battery pack datum 112 and/or second battery pack datum 120 may include information describing, but not limited to, a voltage, resistance, current, impedance, distance traveled, and the like thereof. In a non-limiting embodiment, first battery pack datum 112 may be different from second battery pack datum 120. For example and without limitation, first battery pack datum 112 may include a voltage of a battery pack 104 to be 800 volts while second battery pack datum 120 may include a voltage of a battery pack 104 to be 700 volts. For example and without limitation, first battery pack datum 112 may include a current of a battery pack 104 to be 100 kWh while second battery pack datum 120 may include a voltage of a battery pack 104 to be 80 kWh volts. First battery pack datum 112 and/or second battery pack datum 120 may include a temperature datum. A "temperature datum," for the purposes of this disclosure, is any datum or element of data describing the temperature of a battery pack. Temperature datum may include a heating parameter and a cooling parameter. Heating parameter may include a rate of temperature increase of a battery pack 104. Cooling parameter may include a rate of temperature decrease of a battery pack 104. For example and without limitation, temperature datum may include a temperature of 60 to 80 degrees Fahrenheit. For example and without limitation, cooling parameter may include a temperature of a battery to be any temperature below 40 degrees Fahrenheit. For example and without limitation, heating parameter may include a temperature of a battery to be any temperature above 100 degrees Fahrenheit. In a non-limiting embodiment, the temperature datum of first battery pack datum 112 may be different from the temperature datum of second battery pack datum 120. For example and without limitation, temperature datum of first battery pack datum 112 may include a temperature of a battery pack 104 to be 70 degrees Fahrenheit while second battery pack datum 120 may include a temperature of battery pack 104 to be 100 degrees Fahrenheit. In a non-limiting embodiment, first battery pack datum 112 and/or second battery pack datum 120 may include total flight hours that battery pack 104 and/or electric aircraft have been operating. The first battery pack datum and/or second battery pack datum 120 may include total energy flowed through battery pack 104. The first battery pack datum and/or second battery pack datum 120 may include a maintenance history of the battery pack 104. The first battery pack datum and/or second battery pack datum 120 may include an upper voltage threshold. The first battery pack datum and/or second battery pack datum 120 may include a lower voltage threshold. The first battery pack datum and/or second battery pack datum 120 may include a moisture level threshold.

With continued reference to FIG. 1, system 100 may include controller 128. A "controller," for the purpose of this disclosure, is any computing device used to receive and transmit signals. Controller 128 may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, first PMU 108 and second PMU 116 is configured to transmit first battery pack datum 112 and second battery pack datum 120 to controller 128. Controller 128 may include a flight controller. Controller 128 may include any computing device as described in the entirety of this disclosure. In a non-limiting embodiment, first PMU 108 and second PMU 116 may transmit the plurality of battery pack datum as a function of a plurality of physical controller area network (CAN) bus unit. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. For instance and without limitation, physical controller area network bus unit may be consistent with disclosure of any physical controller area network bus in U.S. patent application Ser. No. 17/218,342 and title "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, first PMU 108 may transmit first battery pack datum 120 to controller 128 as a function of a first physical CAN bus unit 136. In a non-limiting embodiment, second PMU 116 may transmit second battery pack datum 120 to controller 128 as a function of a second CAN bus unit 140. Persons skilled in the art, upon reviewing the entirety of this disclosure, will be aware of the plurality of physical CAN bus unit representing the first CAN bus unit 136 and the second CAN bust unit 140 consistent with this disclosure.

With continued reference to FIG. 1, battery pack 104 may include a load of a plurality of loads electrically coupled to the plurality of battery packs. The load may include, without limitation, a plurality of loads; plurality of loads may be communicatively coupled to each battery pack 104 of the plurality of battery packs. "Electrically coupled," for the purpose of this disclosure, is a connection and/or link configured to transfer electrical energy between electrical components such as, but not limited to, circuits. "Communicatively coupled," for the purposes of this disclosure, is a connection and/or link between two or more components electrically, or otherwise connected and configured to transmit and receive signals from one another. Signals may include electrical, electromagnetic, visual, audio, radio waves, or another undisclosed signal type alone or in combination. A "plurality of loads," for the purpose of this disclosure, is a grouping of electrical components such as electrical loads that are used to consume electric power. The load of the plurality of loads may include an electrical component or a portion of an electrical circuit configured to actively consume electric power. The load may comprise a component of the aircraft that is powered by the plurality of battery packs. The load may include any load configured to receive any current. In a non-limiting embodiment, a plurality of loads may be communicatively coupled a plurality of battery packs of an electric aircraft. In a non-limiting embodiment, each load may be individually wired to each battery pack of the plurality of battery packs. For example and without limitation, each load may be configured to be switched off by controller 128 for the purposes of maintaining continuous power output of a plurality of battery packs operating in tandem. In a non-limiting embodiment, the load may include, but not limited to, a port, a pair of terminals, and the like thereof. For example and without limitation, each load may be configured to disconnect a battery pack from an electric aircraft safely without interrupting or harming the electric aircraft and its operations. For example, the load may comprise a motor, a fan, a processor, avionics, or any appropriate load. The diodes allow current to flow in one direction but prevent current from flowing in the opposite direction. In a non-limiting embodiment, the diodes may allow current to flow towards the load and prevent current from flowing toward the plurality of battery cells. In some embodiments, parallel battery cells used are identical. In a non-limiting embodiment, a higher voltage battery in parallel with a lower voltage battery without diodes present may result in charge flowing from the higher voltage battery to the lower voltage battery, causing battery failure. In a non-limiting embodiment, diodes may electrically isolate the parallel batteries, preventing charge shuttling between the batteries and providing a protective measure. In a non-limiting embodiment, the presence and placement of diodes in relation to the parallel batteries may enable the batteries to operate as independent entities. In a non-limiting embodiment, each parallel battery is independently wired to each individual load. For example and without limitation, with distributed wiring, the parallel batteries do not share positive and negative buses. For example, an electric aircraft may comprise twelve lift fans and three forward propulsion motors that require power. Each parallel battery of the aircraft may be individually wired to each fan and motor. In a non-limiting embodiment, distributed wiring may eliminate a single point of failure in the aircraft by providing redundancy. For example and without limitation, in the event a short occurs between the positive and negative terminals of one battery, only the one battery may be affected. In a non-limiting embodiment, the loads of the aircraft may remain powered and unaffected due to connections to other batteries. In a non-limiting embodiment, each load may be individually wired to every parallel battery in the system. For example and without limitation, a large wire harness may be utilized due to the many wires. In a non-limiting embodiment, the most redundancy may be achieved in the event that every battery is individually wired to every load. In some embodiments, the parallel batteries may be grouped together (e.g. in a pack) wherein each group is connected to a shared positive bus and a shared negative bus. In a non-limiting embodiment, each group may be separately wired to every load. In a non-limiting embodiment, six loads may be present on one wing of the electric aircraft. In some embodiments, another six loads are present on another wing of the aircraft. Each parallel battery may include its own wiring to the six loads. Each battery as shown has six wires attached at its positive terminal and six wires attached at its negative terminal. The six wires attached at the positive terminal may each connect the battery to a positive terminal of one of the six loads. The six wires attached at the negative terminal may connect the battery to negative terminals of the six loads.

With continued reference to FIG. 1, battery pack 104 may include contactor 124 coupled to the electric aircraft. A "contactor," for the purpose of this disclosure, is a switch that is responsible for switching power to any of the loads supplied by the battery. "Coupled," for the purpose of this disclosure, is any coupling such as mechanical coupling for an electrical device to be directly connected to another electrical device. Contactor 124 may include an electromagnetic switch. Contactor 124 may include a switching functionality for the plurality of loads. Contactor may include at least a load switch. Contactor 124 may include a high voltage connection which may include any high voltage connection. Contactor 124 may include, but not limited to, a high voltage current sense, a high voltage pyro fuse, a high voltage contactor, a ground fault detection, and the like thereof. In a non-limiting embodiment, contactor 124 may be configured to switch off a plurality of loads in order to safely disconnect a battery pack from the electric aircraft. In a non-limiting embodiment, contactor 124 may include, but not limited to, a port, a pair of terminals, and the like thereof. In a non-limiting embodiment, contactor 124 may be configured to switch off a plurality of loads as a function of an aircraft high voltage ring bus. An "aircraft high voltage ring bus," for the purpose of this disclosure, is a bus scheme configured to form a ring of circuit breakers. Aircraft high voltage ring bus 144 may be used to terminate the power output of battery pack 104 or a plurality of battery backs. Aircraft high voltage ring bus 144 may be used to control contactor 124 and switch off a plurality of loads coupled to a plurality of battery packs. In a non-limiting embodiment, aircraft high voltage ring bus 144 may be used by a controller to control the actions of contactor 124 and/or the plurality of loads. Persons skilled in the art, upon reviewing the entirety of this disclosure, will be aware of the various capabilities of the aircraft high voltage ring bus 144 in tandem with controller and contactor consistent with this disclosure.

With continued reference to FIG. 1, controller 128 is configured to receive first battery pack datum 112 from first PMU 108 and second battery pack datum 120 from second PMU 116. In a non-limiting embodiment, controller 128 may be configured to receive the plurality of first and second battery pack datum as a function of the plurality of physical CAN bus units. For example and without limitation, controller 128 may receive first battery pack datum 112 as a function of first physical CAN bus unit 136 and receive second battery pack datum 120 as a function of second physical CAN bus unit 140.

With continued reference to FIG. 1, controller 128 is configured to compare first battery pack datum 112 to second battery pack datum 120 as a function of a differential threshold. The comparison of first battery pack datum 112 and second battery pack datum 120 may include a level of difference between the two datum. For example and without limitation, A "differential threshold," for the purpose of this disclosure, is a difference in value between first battery pack datum 112 and second battery pack datum 120 should fall within, such as a minimum standard deviation. In a non-limiting embodiment, differential threshold may include a percentage of 5 percent. For example and without limitation, a comparison of first battery pack datum 112 and second battery pack datum 120 resulting in a differential of 4 percent means that the comparison falls within the differential threshold. For example and without limitation, a comparison of the first battery pack datum and second battery pack datum 120 resulting in a differential of 10 percent means that the comparison falls out of the differential threshold. In a non-limiting embodiment, differential threshold may include a standard deviation of 0.5 degrees Fahrenheit. For example and without limitation, a comparison may result in a difference of temperature of a battery pack to be 2 degrees Fahrenheit which means that the comparison falls outside of the differential threshold. In a non-limiting embodiment, differential threshold may include an upper threshold value and/or percentage the average of first battery pack datum 112 and second battery pack datum 120 must not exceed. For example and without limitation, the upper threshold value may include a limit of 120 degrees Fahrenheit. In a non-limiting embodiment, differential threshold may include a lower threshold value and/or percentage the average of first battery pack datum 112 and second battery pack datum 120 must stay above. For example and without limitation, the lower threshold value may include a lower limit of 40 degrees Fahrenheit.

With continued reference to FIG. 1, controller 128 is configured to generate alert datum 132 as a function of the comparison of the first battery pack datum and second battery pack datum 120. Alert datum 132 may be configured to be generated in the instance the comparison results fall outside of the differential threshold. An "alert datum," for the purpose of this disclosure, is any datum or element of data describing information regarding potentially hazardous conditions of battery pack 104. Alert datum 132 may include a plurality of warning signs. In a non-limiting embodiment, alert datum 132 may include a plurality of indicators highlighting a phenomenon of a failure, fault, and/or any potentially hazardous event. In a non-limiting embodiment, alert datum 132 may include a plurality of safety measures, safety instructions, maintenance information, and the like thereof. Alert datum 132 may include a plurality of individual alert datums assigned to each battery pack 104 of a plurality of battery packs. In a non-limiting embodiment, alert datum 132 may include a warning sign for each battery pack 104 of the plurality of battery packs that contain a comparison that falls outside of the differential threshold. Alert datum 132 may include a plurality of results of a plurality of comparisons for the plurality of battery packs. For example and without limitation, no battery pack 104 may trigger an alert datum as a function of no battery pack resulting in a comparison that falls outside of the differential threshold in which alert datum 132 may still be generated to indicate no battery pack 104 is endangered. In a non-limiting embodiment, alert datum 132 may be used to inform a user the health status of each battery pack 104. In a non-limiting embodiment, alert datum 132 may include a boolean determination. For example and without limitation, alert datum 132 may include an "X" for each battery pack 104 resulting in a comparison that falls outside of the differential threshold and an "O" for each battery pack 104 resulting in a comparison that falls within the differential threshold. In a non-limiting embodiment, alert datum 132 may be transmitted and displayed on a user device. Persons skilled in the art, upon reviewing the entirety of this disclosure, will be aware of the various indicators of a conditional representing the comparison in the form of an alert datum consistent with this disclosure.

With continued reference to FIG. 1, alert datum 132 may generated as a function of a machine-learning model and controller 128. Controller 128 may be configured to receive a pair of battery pack datum, wherein the pair comprises the first battery pack datum from first PMU 108 and second battery pack datum 120 from second PMU 116. Controller 128 may be configured to retrieve a battery pack training set from a battery database, wherein the battery pack training set comprises a previous first battery pack datum and a previous second battery pack datum from a previous instance of storing. Controller 128 may be configured to generate a machine-learning model, wherein the machine-learning model is configured to receive the pair of battery pack datum as an input and output alert datum 132 as a function of the battery pack training set. A "previous battery pack datum," for the purpose of this disclosure, is any battery pack datum that controller 128 has stored in a previous iteration of storing of a plurality of battery pack datum. In a non-limiting embodiment, controller 128 may compare a plurality of previous battery pack datums to the current plurality of first and second battery pack datums as a function of the differential threshold to generate alert datum 132. For example and without limitation, controller 128 may receive the first battery pack datum and second battery pack datum 120 in which the comparison results in an average temperature of a battery pack 104 to be 100 degrees Fahrenheit. The controller may retrieve training data from the battery database which may include a comparison results of a previous iteration, in which the previous iteration occurred at the most recent electric aircraft startup, of a comparison of a pair of first and second battery pack datum to have an average temperature of 80 degrees Fahrenheit. Controller 128 may detect an upward trend and conclude a future iteration resulting in a comparison that results in an average temperature above the upper-level threshold of the differential threshold and generate alert datum 132 as a function of the prediction of the upward trend. In a non-limiting embodiment, controller 128 may detect a downward trend as a function of the lower-level threshold of the differential threshold in a similar manner as described above. Persons skilled in the art, upon reviewing the entirety of this disclosure, will be aware of the various scenarios of comparing old datum and current datum consistent with this disclosure.

Figure 2:
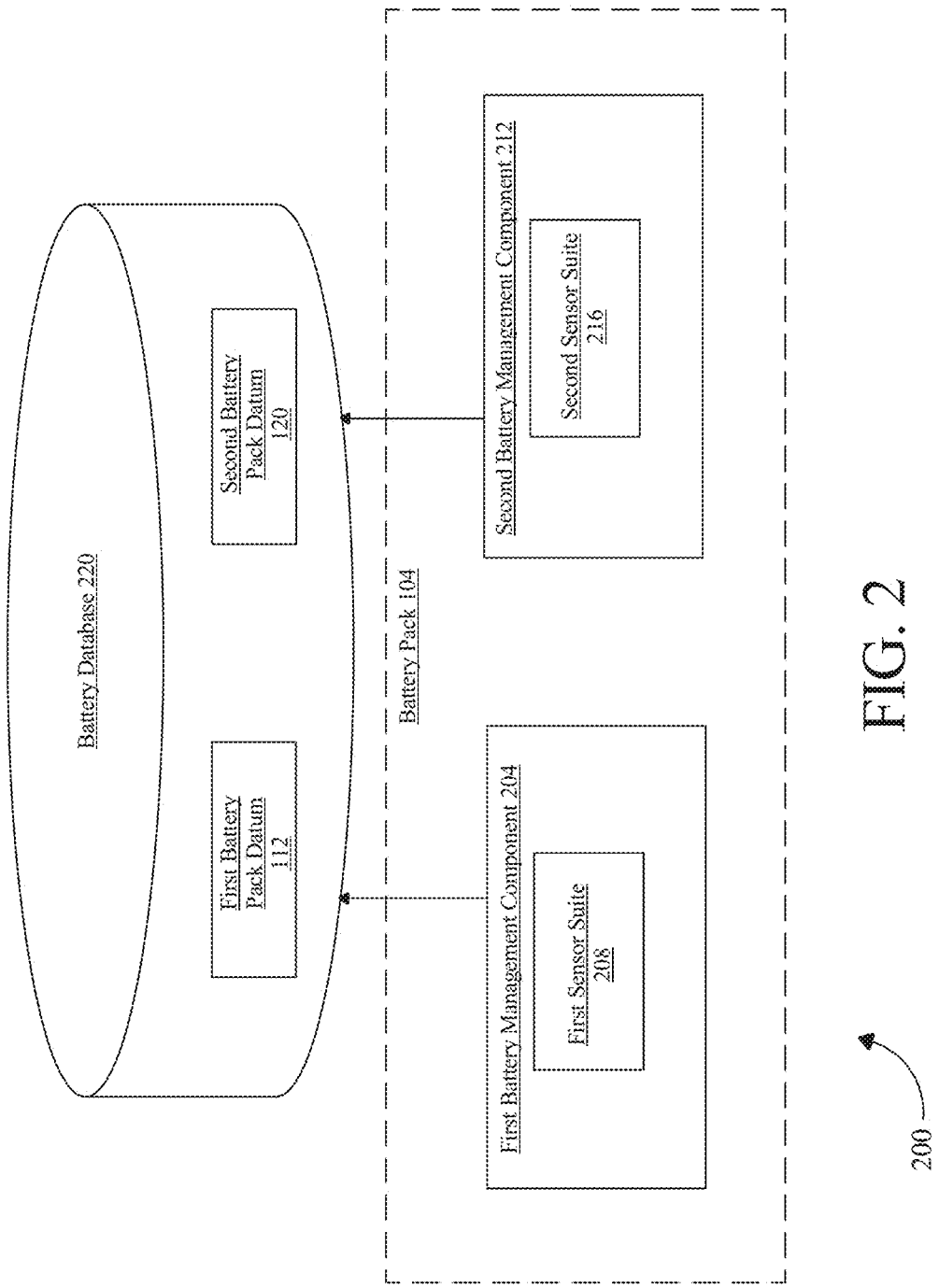
FIG. 2 is a block diagram of an exemplary embodiment of a battery management system.

Referring now to FIG. 2, an embodiment of battery management system 200 is presented. Battery management system 200 may be integrated in a battery pack 104 configured for use in an electric aircraft. The battery management system 200 may be integrated in a portion of the battery pack 104 or subassembly thereof. Battery management system 200 includes first battery management component 204 disposed on a first end of the battery pack. One of ordinary skill in the art will appreciate that there are various areas in and on a battery pack and/or subassemblies thereof that may include first battery management component 204. First battery management component 204 may take any suitable form. In a non-limiting embodiment, first battery management component 204 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 204 may be soldered or otherwise electrically connected to a circuit board. First battery management component may be disposed directly over, adjacent to, facing, and/or near a battery module and specifically at least a portion of a battery cell. First battery management component 204 includes first sensor suite 208. First sensor suite 208 is configured to measure, detect, sense, and transmit first plurality of battery pack datum 112 to battery database 220.

Referring again to FIG. 2, battery management system 200 includes second battery management component 212. For instance and without limitation, battery management system may be consistent with disclosure of battery management system in U.S. patent application Ser. No. 17/108,798 and titled "SYSTEMS AND METHODS FOR A BATTERY MANAGEMENT SYSTEM INTEGRATED IN A BATTERY PACK CONFIGURED FOR USE IN ELECTRIC AIRCRAFT," which is incorporated herein by reference in its entirety. Second battery management component 212 is disposed in or on a second end of battery pack 104. Second battery management component 212 includes second sensor suite 216. Second sensor suite 216 may be consistent with the description of any sensor suite disclosed herein. Second sensor suite 216 is configured to measure second plurality of battery pack datum 120. Second plurality of battery pack datum 120 may be consistent with the description of any battery pack datum disclosed herein. Second plurality of battery pack datum 120 may additionally or alternatively include data not measured or recorded in another section of battery management system 200. Second plurality of battery pack datum 120 may be communicated to additional or alternate systems to which it is communicatively coupled. Second sensor suite 216 includes a moisture sensor consistent with any moisture sensor disclosed herein, namely moisture sensor 208.

With continued reference to FIG. 2, first battery management component 204 disposed in or on battery pack 104 may be physically isolated from second battery management component 212 also disposed on or in battery pack 104. "Physical isolation," for the purposes of this disclosure, refer to a first system's components, communicative coupling, and any other constituent parts, whether software or hardware, are separated from a second system's components, communicative coupling, and any other constituent parts, whether software or hardware, respectively. In a non-limiting embodiment, the plurality of the first and second battery management component may be outside the battery pack 104. First battery management component 204 and second battery management component 216 may perform the same or different functions in battery management system 200. In a non-limiting embodiment, the first and second battery management components perform the same, and therefore redundant functions. If, for example, first battery management component 204 malfunctions, in whole or in part, second battery management component 216 may still be operating properly and therefore battery management system 200 may still operate and function properly for electric aircraft in which it is installed. Additionally or alternatively, second battery management component 216 may power on while first battery management component 204 is malfunctioning. One of ordinary skill in the art would understand that the terms "first" and "second" do not refer to either "battery management components" as primary or secondary. In non-limiting embodiments, first battery management component 204 and second battery management component 216 may be powered on and operate through the same ground operations of an electric aircraft and through the same flight envelope of an electric aircraft. This does not preclude one battery management component, first battery management component 204, from taking over for second battery management component 216 if it were to malfunction. In non-limiting embodiments, the first and second battery management components, due to their physical isolation, may be configured to withstand malfunctions or failures in the other system and survive and operate. Provisions may be made to shield first battery management component 204 from second battery management component 216 other than physical location such as structures and circuit fuses. In non-limiting embodiments, first battery management component 204, second battery management component 216, or subcomponents thereof may be disposed on an internal component or set of components within battery pack 104, such as on battery module sense board 220.

Referring again to FIG. 2, first battery management component 204 may be electrically isolated from second battery management component 216. "Electrical isolation", for the purposes of this disclosure, refer to a first system's separation of components carrying electrical signals or electrical energy from a second system's components. First battery management component 204 may suffer an electrical catastrophe, rendering it inoperable, and due to electrical isolation, second battery management component 216 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 2, battery management system 200 includes battery database 220. Battery database 220 is configured to store first plurality of battery pack datum 112 and second plurality of battery pack datum 120. Battery database 220 may include a database. Battery database 220 may include a solid-state memory or tape hard drive. Battery database 220 may be communicatively coupled to first battery management component 204 and second battery management component 212 and may be configured to receive electrical signals related to physical or electrical phenomenon measured and store those electrical signals as first battery pack datum 112 and second battery pack datum 120, respectively. Alternatively, battery database 220 may include more than one discrete battery database that are physically and electrically isolated from each other. In this non-limiting embodiment, each of first battery management component 204 and second battery management component 212 may store first battery pack datum 112 and second battery pack datum 120 separately. One of ordinary skill in the art would understand the virtually limitless arrangements of data stores with which battery management system 200 could employ to store the first and second plurality of battery pack datum.

Referring again to FIG. 2, battery database 220 stores first plurality of battery pack datum 112 and second plurality of battery pack datum 120. First plurality of battery pack datum 112 and second plurality of battery pack datum 120 may include total flight hours that battery pack 104 and/or electric aircraft have been operating. The first and second plurality of battery pack datum may include total energy flowed through battery pack 104. Battery database 220 may be implemented, without limitation, as a relational database, a key-value retrieval datastore such as a NOSQL database, or any other format or structure for use as a datastore that a person skilled in the art would recognize as suitable upon review of the entirety of this disclosure. Battery database 220 may contain datasets that may be utilized by an unsupervised machine-learning model to find trends, cohorts, and shared datasets between data contained within battery database 220 and first battery pack datum 112 and/or second battery pack datum 120. In an embodiment, datasets contained within battery database 220 may be categorized and/or organized according to shared characteristics. For instance and without limitation, one or more tables contained within battery database 220 may include first battery pack datum table. First battery pack datum table may contain datasets classified to first battery pack information of first battery pack datum. First battery pack information may include datasets describing any first battery pack datum as described herein. One or more tables contained within battery database 220 may include a second battery pack datum table. second battery pack datum table may contain datasets classified to second battery pack information of second battery pack datum. Second battery pack information may include datasets describing any second battery pack datum as described herein. One or more tables contained within battery database 220 may include a comparison datum table. Comparison datum table may include datasets classified by level of comparison between first battery pack datum 112 and second battery pack datum 120. Comparison datum table may include datasets classified by the severity of the difference of the comparison of the first and second battery pack datum from the differential threshold. Battery database 220 may be communicatively coupled to sensors that detect, measure and store energy in a plurality of measurements which may include current, voltage, resistance, impedance, coulombs, watts, temperature, or a combination thereof. Additionally or alternatively, battery database 220 may be communicatively coupled to a sensor suite consistent with this disclosure to measure physical and/or electrical characteristics. Battery database 220 may be configured to store first battery pack datum 112 and second battery pack datum 120 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Battery database 220 may store the first and second battery pack datum that includes an upper voltage threshold and lower voltage threshold consistent with this disclosure. First battery pack datum 112 and second battery pack datum 120 may include a moisture level threshold. The moisture level threshold may include an absolute, relative, and/or specific moisture level threshold. Battery management system 200 may be designed to the Federal Aviation Administration (FAA)'s Design Assurance Level A (DAL-A), using redundant DAL-B subsystems.

With continued reference to FIG. 2, battery management system 200 may include a data collection system, which may include a central sensor suite which may be used for first sensor suite 208 in first battery management component 104 or second sensor suite 216 in second battery management component 112 or consistent with any sensor suite disclosed hereinabove. Data collection system includes battery database 220. Central sensor suite is configured to measure physical and/or electrical phenomena and characteristics of battery pack 104, in whole or in part. Central sensor suite then transmits electrical signals to battery database 220 to be saved. Those electrical signals are representative of first battery pack datum 112 and second battery pack datum 120. The electrical signals communicated from central sensor suite, and more moreover from the first or second battery management component 212 to which it belongs may be transformed or conditioned consistent with any signal conditioning present in this disclosure. Data collection system and more specifically first battery management component 104, may be configured to save first battery pack datum 112 and second battery pack datum 120 periodically in regular intervals to battery database 220. "Regular intervals," for the purposes of this disclosure, refers to an event taking place repeatedly after a certain amount of elapsed time. Data collection system may include first battery management component 104, which may include timer 504. Timer 504 may include a timing circuit, internal clock, or other circuit, component, or part configured to keep track of elapsed time and/or time of day. For example, in non-limiting embodiments, battery database 220 may save the first and second battery pack datum every 30 seconds, every minute, every 30 minutes, or another time period according to timer 504. Additionally or alternatively, battery database 220 may save the first and second battery pack datum after certain events occur, for example, in non-limiting embodiments, each power cycle, landing of the electric aircraft, when battery pack is charging or discharging, or scheduled maintenance periods. In non-limiting embodiments, battery pack 104 phenomena may be continuously measured and stored at an intermediary storage location, and then permanently saved by battery database 220 at a later time, like at a regular interval or after an event has taken place as disclosed hereinabove. Additionally or alternatively, battery database may be configured to save first battery pack datum 112 and second battery pack datum 120 at a predetermined time. "Predetermined time," for the purposes of this disclosure, refers to an internal clock within battery management system 100 commanding battery database 220 to save the first and second battery pack datum at that time. For example, battery database 220 may be configured to save the first and second battery pack datum at 0600 hours, 11 P.M. EDT, another time, multiple times a day, and/or the like.

Figure 3:
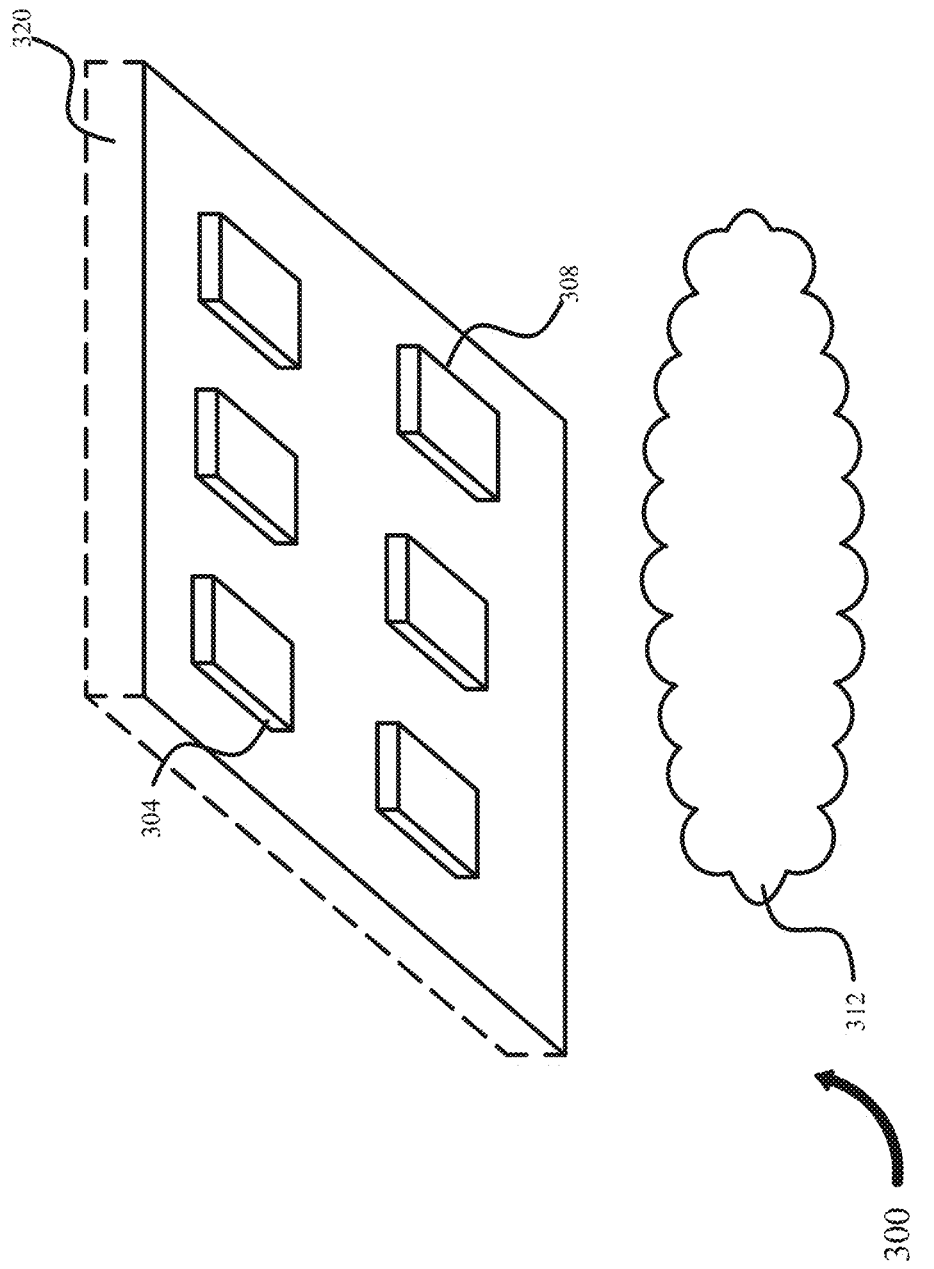
FIG. 3 is an illustration of a sensor suite in partial cut-off view.

Referring now to FIG. 3, an embodiment of sensor suite 300 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 104 measuring temperature, electrical characteristic such as voltage, amperage, resistance, or impedance, or any other parameters and/or quantities as described in this disclosure. For example and without limitation, measured data by at least a sensor may include, but not limited to, an operating voltage of 32V, storage temperature of 25 degrees Celsius, operating temperature of 60 degrees Celsius, reverse-polarity voltage of −20V/60 s, maximum current of 2,000 A, operating current of 20 mA, and the like thereof. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 200 and/or user to detect phenomenon is maintained and in a non-limiting example, a user alter aircraft usage pursuant to sensor readings.

Sensor suite 300 may be suitable for use as first sensor suite 208 and/or second sensor suite 216. Sensor suite 300 includes a moisture sensor 304. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present state of absolute humidity relative to a maximum humidity given the same temperature. "Specific humidity," for the purposes of this disclosure, is the ratio of water vapor mass to total moist air parcel mass, where parcel is a given portion of a gaseous medium. Moisture sensor 304 may be psychrometer. Moisture sensor 304 may be a hygrometer. Moisture sensor 304 may be configured to act as or include a humidistat. A "humidistat," for the purposes of this disclosure, is a humidity-triggered switch, often used to control another electronic device. Moisture sensor 304 may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 3, sensor suite 300 may include electrical sensors 308. Electrical sensors 308 may be configured to measure voltage across a component, electrical current through a component, and resistance of a component. Electrical sensors 308 may include separate sensors to measure each of the previously disclosed electrical characteristics such as voltmeter, ammeter, and ohmmeter, respectively.

Alternatively or additionally, and with continued reference to FIG. 3, sensor suite 300 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 300 and/or a control circuit incorporated therein and/or communicatively connected thereto may be configured to adjust charge to one or more battery cells as a function of a charge level and/or a detected parameter. For instance, and without limitation, sensor suite 300 may be configured to determine that a charge level of a battery cell is high based on a detected voltage level of that battery cell or portion of the battery pack. Sensor suite 300 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 300 may include digital sensors, analog sensors, or a combination thereof. Sensor suite 300 may include digital-to-analog converters (DAC), analog-to-digital converters (ADC, A/D, A-to-D), a combination thereof, or other signal conditioning components used in transmission of a first plurality of battery pack data 128 to a destination over wireless or wired connection.

With continued reference to FIG. 3, sensor suite 300 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 300, may be measured in Fahrenheit (° F.), Celsius (° C.), Kelvin (° K), or another scale alone or in combination. The temperature measured by sensors may comprise electrical signals which are transmitted to their appropriate destination wirelessly or through a wired connection.

With continued reference to FIG. 3, sensor suite 300 may include a sensor configured to detect gas that may be emitted during or after a cell failure. "Cell failure," for the purposes of this disclosure, refers to a malfunction of a battery cell, which may be an electrochemical cell, which renders the cell inoperable for its designed function, namely providing electrical energy to at least a portion of an electric aircraft. Byproducts of cell failure 312 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 300, may be configured to detect combustible, flammable, toxic, oxygen depleted, a combination thereof, or another type of gas alone or in combination. The gas sensor that may be present in sensor suite 300 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 300 may include sensors that are configured to detect non-gaseous byproducts of cell failure 312 including, in non-limiting examples, liquid chemical leaks including aqueous alkaline solution, ionomer, molten phosphoric acid, liquid electrolytes with redox shuttle and ionomer, and salt water, among others. Sensor suite 300 may include sensors that are configured to detect non-gaseous byproducts of cell failure 312 including, in non-limiting examples, electrical anomalies as detected by any of the previously disclosed sensors or components.

With continued reference to FIG. 3, sensor suite 300 may be configured to detect events where voltage nears an upper voltage threshold or lower voltage threshold. The upper voltage threshold may be stored in battery database 220 for comparison with an instant measurement taken by any combination of sensors present within sensor suite 300. The upper voltage threshold may be calculated and calibrated based on factors relating to battery cell health, maintenance history, location within battery pack, designed application, and type, among others. Sensor suite 300 may measure voltage at an instant, over a period of time, or periodically. Sensor suite 300 may be configured to operate at any of these detection modes, switch between modes, or simultaneous measure in more than one mode. First battery management component 204 may detect through sensor suite 300 events where voltage nears the lower voltage threshold. The lower voltage threshold may indicate power loss to or from an individual battery cell or portion of the battery pack. First battery management component 204 may detect through sensor suite 300 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 4:
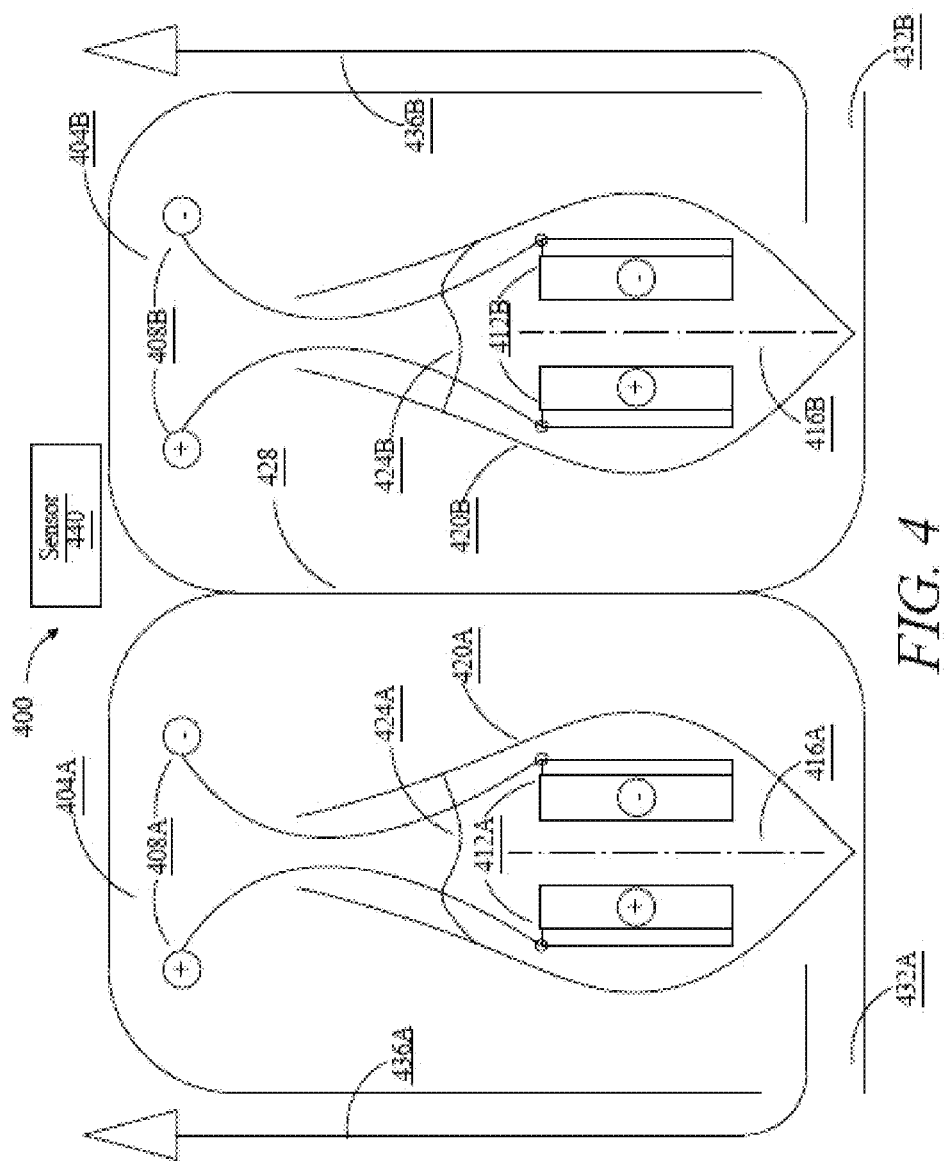
FIG. 4 is a block diagram of an exemplary battery pack for preventing progression of thermal runaway between modules.

Now referring to FIG. 4 a block diagram of an exemplary battery pack 400 for preventing progression of thermal runaway between modules is illustrated. Battery pack 400 may include pouch cell 404A-B. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. Pouch cell 404A-B may include at least a pair of electrodes 408A-B. At least a pair of electrodes 408A-B may include a positive electrode and a negative electrode. Each electrode of at least a pair of electrodes 408A-B may include an electrically conductive element. Non-limiting exemplary electrically conductive elements include braided wire, solid wire, metallic foil, circuitry, such as printed circuit boards, and the like. At least a pair of electrodes 408A-B may be in electric communication with and/or electrically connected to at least a pair of foil tabs 412A-B. At least a pair of electrodes 408A-B may be bonded in electric communication with and/or electrically connected to at least a pair of foil tabs 412A-B by any known method, including without limitation welding, brazing, soldering, adhering, engineering fits, electrical connectors, and the like. In some cases, at least a pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. A pouch cell 404A-B may include an insulator layer 416A-B. As used in this disclosure, an "insulator layer" is an electrically insulating material that is substantially permeable to battery ions, such as without limitation lithium ions. In some cases, insulator layer may be referred to as a separator layer or simply separator. In some cases, insulator layer 416A-B is configured to prevent electrical communication directly between at least a pair of foil tabs 412A-B (e.g., cathode and anode). In some cases, insulator layer 416A-B may be configured to allow for a flow of ions across it. Insulator layer 416A-B may consist of a polymer, such as without limitation polyolifine (PO). Insulator layer 416A-B may comprise pours which are configured to allow for passage of ions, for example lithium ions. In some cases, pours of a PO insulator layer 416A-B may have a width no greater than 100 µm, 10 µm, or 0.1 µm. In some cases, a PO insulator layer 416A-B may have a thickness within a range of 1-100 µm, or 10-50 µm.

With continued reference to FIG. 4, pouch cell 404A-B may include a pouch 420A-B. Pouch 420A-B may be configured to substantially encompass at least a pair of foil tabs 412A-B and at least a portion of insulator layer 416A-B. In some cases, pouch 420A-B may include a polymer, such as without limitation polyethylene, acrylic, polyester, and the like. In some cases, pouch 420A-B may be coated with one or more coatings. For example, in some cases, pouch may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte 424A-B is located within pouch. In some cases, electrolyte 424A-B may comprise a liquid, a solid, a gel, a paste, and/or a polymer. Electrolyte may wet or contact one or both of at least a pair of foil tabs 412A-B.

With continued reference to FIG. 4, battery pack 400 may additionally include an ejecta barrier 428. Ejecta barrier may be located substantially between a first pouch cell 404A and a second pouch cell 404B. As used in this disclosure, an "ejecta barrier" is any material or structure that is configured to substantially block, contain, or otherwise prevent passage of ejecta. As used in this disclosure, "ejecta" is any material that has been ejected, for example from a battery cell. In some cases, ejecta may be ejected during thermal runaway of a battery cell. Alternatively or additionally, in some cases, eject may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then cool and condense into a solid or liquid after ejection. In some cases, ejecta barrier may be configured to prevent materials ejected from a first pouch cell 404A from coming into contact with a second pouch cell 404B. For example, in some instances ejecta barrier 428 is substantially impermeable to ejecta from battery pouch cell 404A-B. In some embodiments, ejecta barrier 428 may include titanium. In some embodiments, ejecta barrier 428 may include carbon fiber. In some cases, ejecta barrier 428 may include at least a one of a lithiophilic or a lithiophobic material or layer, configured to absorb and/or repel lithium-based compounds. In some cases, ejecta barrier 428 may comprise a lithiophilic metal coating, such as silver or gold. In some cases, ejecta barrier 428 may be flexible and/or rigid. In some cases, ejecta barrier 428 may include a sheet, a film, a foil, or the like. For example in some cases, ejecta barrier may be between 25 and 5,000 micrometers thick. In some cases, an ejecta barrier may have a nominal thickness of about 2 mm. Alternatively or additionally, in some cases, an ejecta barrier may include rigid and/or structural elements, for instance which are solid. Rigid ejecta barriers 428 may include metals, composites and the like. In some cases, ejecta barrier 428 may be further configured to structurally support at least a pouch cell 428. For example in some cases, pouch cell 428 may be mounted to a rigid ejecta barrier 428.

With continued reference to FIG. 4, battery pack 400 may additionally include at least a vent 432A-B. In some cases, at least a vent 432A may be configured to vent ejecta from first pouch cell 404A. In some cases, vent 404A may be configured to vent ejecta along flow path 436A. Flow path 436A may substantially exclude second pouch cell 404B, for example fluids such as gases liquids, or any material that acts as a gas or liquid, flowing along flow path 436A may be cordoned away from contact with second pouch cell 404B. For example flow path 436A may be configured to not intersect with any surface of second pouch cell 404B. Flow path 436A-B may include any channel, tube, hose, conduit, or the like suitable for facilitating fluidic communication, for example with pouch cell 404A-B. In some cases, flow path 436A-B may include a check valve. As used in this disclosure, a "check valve" is a valve that permits flow of a fluid only in certain, for example one, direction. In some cases check valve may be configured to allow flow of fluids substantially only away from battery pouch cell 404A-B, while preventing back flow of vented fluid to battery pouch cell 404A-B. In some cases, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 432A-B may have a vacuum applied to aid in venting of ejecta. Vacuum pressure differential may range from 0.1"Hg to 36"Hg.

With continued reference to FIG. 4, battery pack 400 may include first battery pouch cell 404A and second battery pouch cell 404B. First pouch cell 404A may include first pair of electrodes 408A, first pair of foil tabs 412A in electrical communication with first electrodes 408A, first insulator layer 416A located substantially between first pair of foil tabs 412A, first pouch 420A substantially encompassing first pair of foil tabs 412A and at least a portion first separator layer 416A, and first electrolyte 424A within first pouch 420A. Second pouch cell 404B may second pair of electrodes 408B, second pair of foil tabs 412B in electrical communication with first electrodes 408B, second insulator 416B located substantially between first pair of foil tabs 412B, second pouch 420B substantially encompassing second pair of foil tabs 412B and at least a portion of second insulator 416B, and second electrolyte 424B within second pouch 420B. Battery pack 400 may include ejecta barrier 428 located substantially between first pouch cell 404A and second pouch cell 404B. Ejecta barrier 428 may be substantially impermeable to ejecta, for example ejecta from first pouch cell 404A. In some cases, battery pack 400 may include a vent configured to vent ejecta, for example from first pouch cell 404A. In some embodiments, ejecta barrier 428 may substantially encapsulate at least a portion of pouch cell 404A-B. For example, ejecta barrier 428 may substantially encapsulate first pouch cell 404A. In some cases, vent may be configured to provide fluidic communication through at least one of ejecta barrier 428 and pouch 420A-B. In some cases, vent may include a seam. Seam may be a seam of pouch 420A-B. Alternatively or additionally; seam may be a seam of ejecta barrier 428.

With continued reference to FIG. 4, in some embodiments battery pack 400 may additionally include a third pouch cell. Third pouch cell may include at least a third pair of electrodes, at least a third pair of foil tabs welded to the third electrodes, at least a third insulator layer located substantially between the at least a third pair of foil tabs, a third pouch substantially encompassing the at least a third pair of foil tabs and the at least a third separator layer, and a third electrolyte within the third pouch. Battery pack may include a plurality including any number of pouch cells. In some cases, each pouch cell of plurality of pouch cells is separated from adjacent pouch cells with at least an ejecta barrier 428. Any pouch cell of plurality of pouch cells in battery pack may include any component described in this disclosure, for example without limitation vents, valves, and the like.

Still referring to FIG. 4, in some embodiments, pouch cells 404A-B may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 404A-B may include lead-based batteries such as without limitation lead acid batteries and lead carbon batteries. Pouch cells 404A-B may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. In a non-limiting embodiment, batteries may incorporate a bus element which further may include a ring bus. For instance and without limitation, ring element may be consistent with ring element found in U.S. patent application Ser. No. 17/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated herein by reference in its entirety. Persons skilled in the art, upon reviewing the entirety of this disclosure, will be aware of various devices of components that may be used as a battery module. In some cases, battery pack 400 is constructed in a manner that vents ejecta, while preventing ejecta from one pouch cell from interacting with another pouch cell.

Referring now to FIG. 5A, a schematic diagram of an exemplary embodiment of system 500 is presented. System 500 includes first energy storage element 504. First energy storage element 504 may be consistent with any energy storage element as described in this disclosure. For example, and without limitation, first energy storage element 504 may include a plurality of battery packs, battery modules, battery cells, or other types of energy storage elements electrically connected together in series and/or parallel. One of ordinary skill in the art would appreciate that there are two energy storage elements illustrated in FIG. 5A, however, any number of energy storage elements may be included in system and operate according to the herein described methodology.

With continued reference to FIG. 5A, exemplary embodiment of system 500 may include bus element 508. Bus element 508 may be consistent with any bus element as described in this disclosure. Bus element 508 may include any manner of conductive material configured to convey electrical energy in any form as described in this disclosure between components. For example, and without limitation, bus element 508 may include any number of components electrically connected thereto, including circuit elements, energy storage elements, propulsors, flight control components, one or more computing devices, sensors, or combination thereof, among others. Bus element 508 may include a plurality of wires and/or conductive strips, bars, structures, or a combination thereof. Bus element 508 may be configured to convey electrical energy configured to power one or more other components electrically connected thereto and/or be configured to convey electrical energy configured to transmit signals between one or more components.

With continued reference to FIG. 5A, exemplary embodiment of system 500 may include a cross tie element 512. Cross tie element 512 may be consistent with any cross tie element as described in this disclosure. Cross tie element 512 may include any electrical switches, relays, components, or combinations thereof. Cross tie element 512 may be electrically connected to bus element 508 and through said bus element 508 may be electrically and communicatively connected to any one or more components as described in this disclosure, namely any of the plurality of energy storage elements such as first energy storage element 504. Cross tie element 512 may be configured to receive one or more electrical signals configured to open or close cross tie element 512. Cross tie element 512, through said opening and closing may electrically disconnect or connect, respectively, first energy storage element from second energy storage element or plurality of energy storage elements as described in this disclosure.

With continued reference to FIG. 5A, exemplary embodiment of system 500 may include a propulsor 516. Propulsor 516 may be electrically and communicatively connected to any of the plurality of other components as described in this disclosure through bus element 508. Propulsor 516 may be one of a plurality of propulsors as described in this disclosure. For example, and without limitation, propulsor 516 may include an electric motor, an actuator consistent with any actuator as described in this disclosure, one or more computing devices, or any other propulsor configured to manipulate a fluid medium.

Figure 5B:
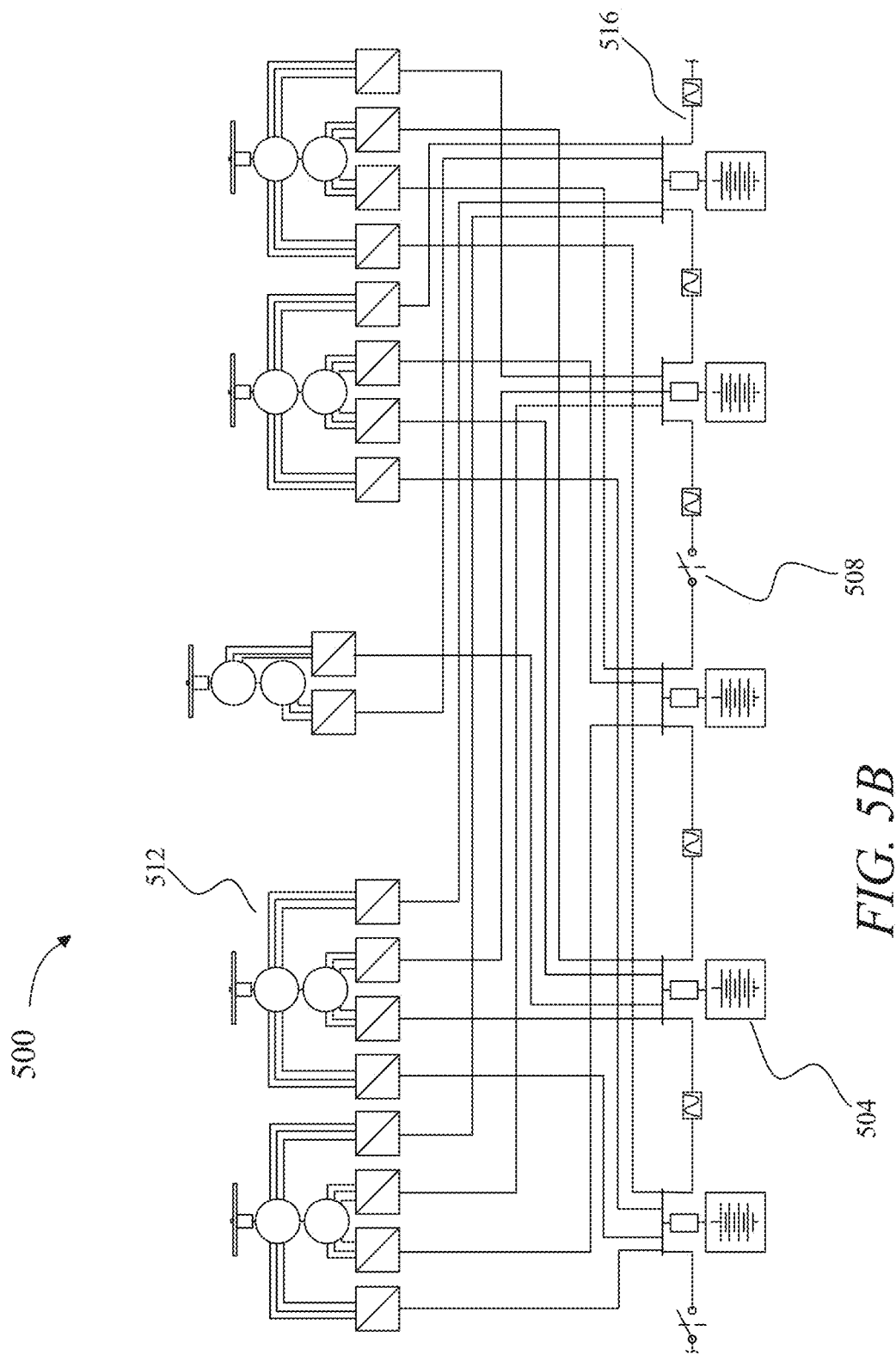
FIG. 5B is a schematic diagram of an exemplary embodiment of a system for dynamic excitation of an energy storage element configured for use in an electric aircraft.

Referring now to FIG. 5B, a schematic diagram of another exemplary embodiment of system 500 is presented in schematic form. System 500 may include a first energy storage element 504. First energy storage element 504 may be consistent with any energy storage element as described in this disclosure. For example, and without limitation, first energy storage element 504 may include a plurality of battery packs, battery modules, battery cells, or other types of energy storage elements electrically connected together in series and/or parallel. One of ordinary skill in the art would appreciate that there are five energy storage elements illustrated in FIG. 5A, however, any number of energy storage elements may be included in system and operate according to the herein described methodology. For example, and without limitation, first energy storage element 504 and any of the plurality of energy storage elements illustrated or described may include portions of larger energy storage elements such as five battery modules housed within one battery pack. For example, and without limitation, first energy storage element 504 may include more than one battery modules housed within one battery pack, a second energy storage element may include a single battery module housed within the same battery pack, and a third energy storage element may include an entire battery pack. One of ordinary skill in the art will appreciate the vast arrangements of energy storage elements and the respective capacities thereof.

With continued reference to FIG. 5B, exemplary embodiment of system 500 may include a bus element 508. Bus element 508 may be consistent with any bus element as described in this disclosure. Bus element 508 may be any manner of conductive material configured to convey electrical energy in any form as described in this disclosure between components. For example, and without limitation, bus element 508 may include any number of components electrically connected thereto, including circuit elements, energy storage elements, propulsors, flight control components, one or more computing devices, sensors, or combination thereof, among others. Bus element 508 may include a plurality of wires or conductive strips, bars, structures, or a combination thereof. Bus element 508 may be configured to convey electrical energy configured to power one or more other components electrically connected thereto and/or be configured to convey electrical energy configured to transmit signals between one or more components.

With continued reference to FIG. 5B, exemplary embodiment of system 500 may include a cross tie element 512. Cross tie element 512 may be consistent with any cross tie element as described in this disclosure. Cross tie element 512 may include any electrical switches, relays, components, or combinations thereof. Cross tie element 512 may be electrically connected to bus element 508 and through said bus element 508 may be electrically and communicatively connected to any one or more components as described in this disclosure, namely any of the plurality of energy storage elements such as first energy storage element 504. Cross tie element 512 may be configured to receive one or more electrical signals configured to open or close cross tie element 512. Cross tie element 512, through said opening and closing may electrically disconnect or connect, respectively, first energy storage element from second energy storage element or plurality of energy storage elements as described in this disclosure.

With continued reference to FIG. 5B, exemplary embodiment of system 500 may include a propulsor 516. Propulsor 516 may be electrically and communicatively connected to any of the plurality of other components as described in this disclosure through bus element 508. Propulsor 516 may be one of a plurality of propulsors as described in this disclosure. For example, and without limitation, propulsor 516 may include an electric motor, an actuator consistent with any actuator as described in this disclosure, one or more computing devices, or any other propulsor configured to manipulate a fluid medium.

With continued reference to FIG. 5B, exemplary embodiment of system 500 may include a fuse 520. Fuse 520 may be consistent with any fuse as described in this disclosure. In general, and for the purposes of this disclosure, a fuse is an electrical safety device that operate to provide overcurrent protection of an electrical circuit. As a sacrificial device, its essential component may be metal wire or strip that melts when too much current flows through it, thereby interrupting energy flow. Fuse 520 may include a thermal fuse, mechanical fuse, blade fuse, expulsion fuse, spark gap surge arrestor, varistor, or a combination thereof. Fuse 520 may be implemented in any number of arrangements and at any point or points within exemplary embodiment of system 500. Fuse 520 may be included between plurality of energy storage elements, propulsors, cross tie elements, or any other component electrically connected to bus element 508. Fuse 520 may be implemented between any other electrical components connected anywhere or in any system comprised by the herein disclosed embodiments.

Figure 6:
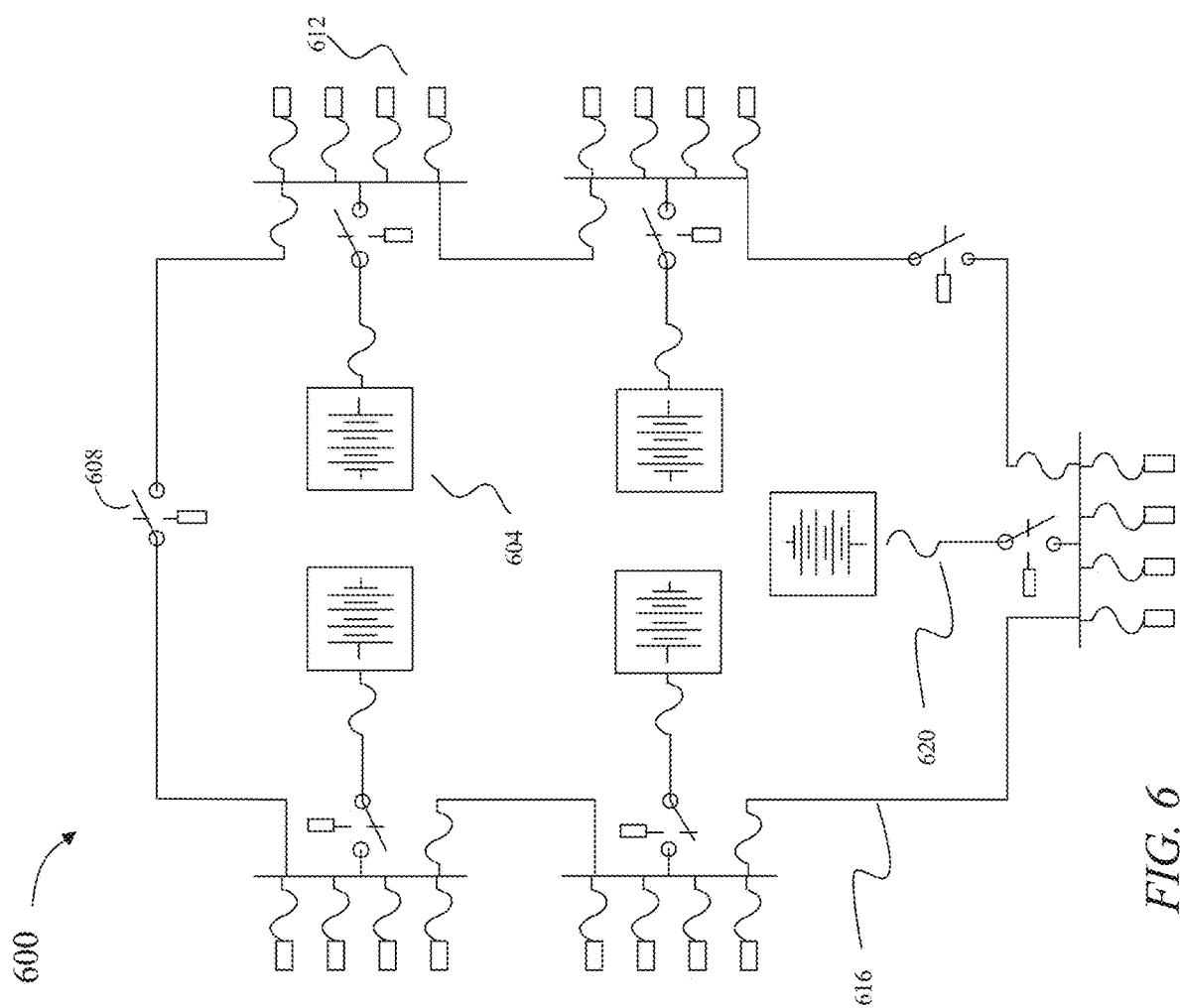
FIG. 6 is a schematic diagram an exemplary embodiment of a bus element with energy storage elements connected thereto.

Referring now to FIG. 6, exemplary embodiment of system 600 is represented in schematic form. System 600 may include a first energy storage element 604. First energy storage element 604 may be consistent with any energy storage element as described in this disclosure. For example, and without limitation, first energy storage element 604 may include a plurality of battery packs, battery modules, battery cells, or other types of energy storage elements electrically connected together in series and/or parallel. One of ordinary skill in the art would appreciate that there are five energy storage elements illustrated in FIG. 6, however, any number of energy storage elements may be included in system and operate according to the herein described methodology. For example, and without limitation, first energy storage element 604 and any of the plurality of energy storage elements illustrated or described may include portions of larger energy storage elements such as five battery modules housed within one battery pack. For example, and without limitation, first energy storage element 604 may include more than one battery modules housed within one battery pack, a second energy storage element may include a single battery module housed within the same battery pack, and a third energy storage element may include an entire battery pack. One of ordinary skill in the art will appreciate the vast arrangements of energy storage elements and the respective capacities thereof.

With continued reference to FIG. 6, exemplary embodiment of system 600 may include a bus element 608. Bus element 608 may be consistent with any bus element as described in this disclosure. Bus element 608 may be any manner of conductive material configured to convey electrical energy in any form as described in this disclosure between components. For example, and without limitation, bus element 608 may include any number of components electrically connected thereto, including circuit elements, energy storage elements, propulsors, flight control components, one or more computing devices, sensors, or combination thereof, among others. Bus element 308 may include a plurality of wires or conductive strips, bars, structures, or a combination thereof. Bus element 148 may be configured to convey electrical energy configured to power one or more other components electrically connected thereto and/or be configured to convey electrical energy configured to transmit signals between one or more components.

With continued reference to FIG. 6, exemplary embodiment of system 600 may include a cross tie element 612. Cross tie element 612 may be consistent with any cross tie element as described in this disclosure. Cross tie element 612 may include any electrical switches, relays, components, or combinations thereof. Cross tie element 612 may be electrically connected to bus element 608 and through said bus element 608 may be electrically and communicatively connected to any one or more components as described in this disclosure, namely any of the plurality of energy storage elements such as first energy storage element 604. Cross tie element 612 may be configured to receive one or more electrical signals configured to open or close cross tie element 612. Cross tie element 612, through said opening and closing may electrically disconnect or connect, respectively, first energy storage element from second energy storage element or plurality of energy storage elements as described in this disclosure.

With continued reference to FIG. 6, exemplary embodiment of system 600 may include a propulsor 616. Propulsor 616 may be electrically and communicatively connected to any of the plurality of other components as described in this disclosure through bus element 608. Propulsor 616 may be one of a plurality of propulsors as described in this disclosure. For example, and without limitation, flight component 160 may include an electric motor, an actuator consistent with any actuator as described in this disclosure, one or more computing devices, or any other propulsor configured to manipulate a fluid medium.

With continued reference to FIG. 6, exemplary embodiment of system 600 may include a fuse 620. Fuse 620 may be consistent with any fuse as described in this disclosure. In general, and for the purposes of this disclosure, a fuse is an electrical safety device that operate to provide overcurrent protection of an electrical circuit. As a sacrificial device, its essential component may be metal wire or strip that melts when too much current flows through it, thereby interrupting energy flow. Fuse 620 may include a thermal fuse, mechanical fuse, blade fuse, expulsion fuse, spark gap surge arrestor, varistor, or a combination thereof. Fuse 620 may be implemented in any number of arrangements and at any point or points within exemplary embodiment of system 600. Fuse 620 may be included between plurality of energy storage elements, propulsors, cross tie elements, or any other component electrically connected to bus element 608. Fuse 620 may be implemented between any other electrical components connected anywhere or in any system comprised by the herein disclosed embodiments.

Figure 7:
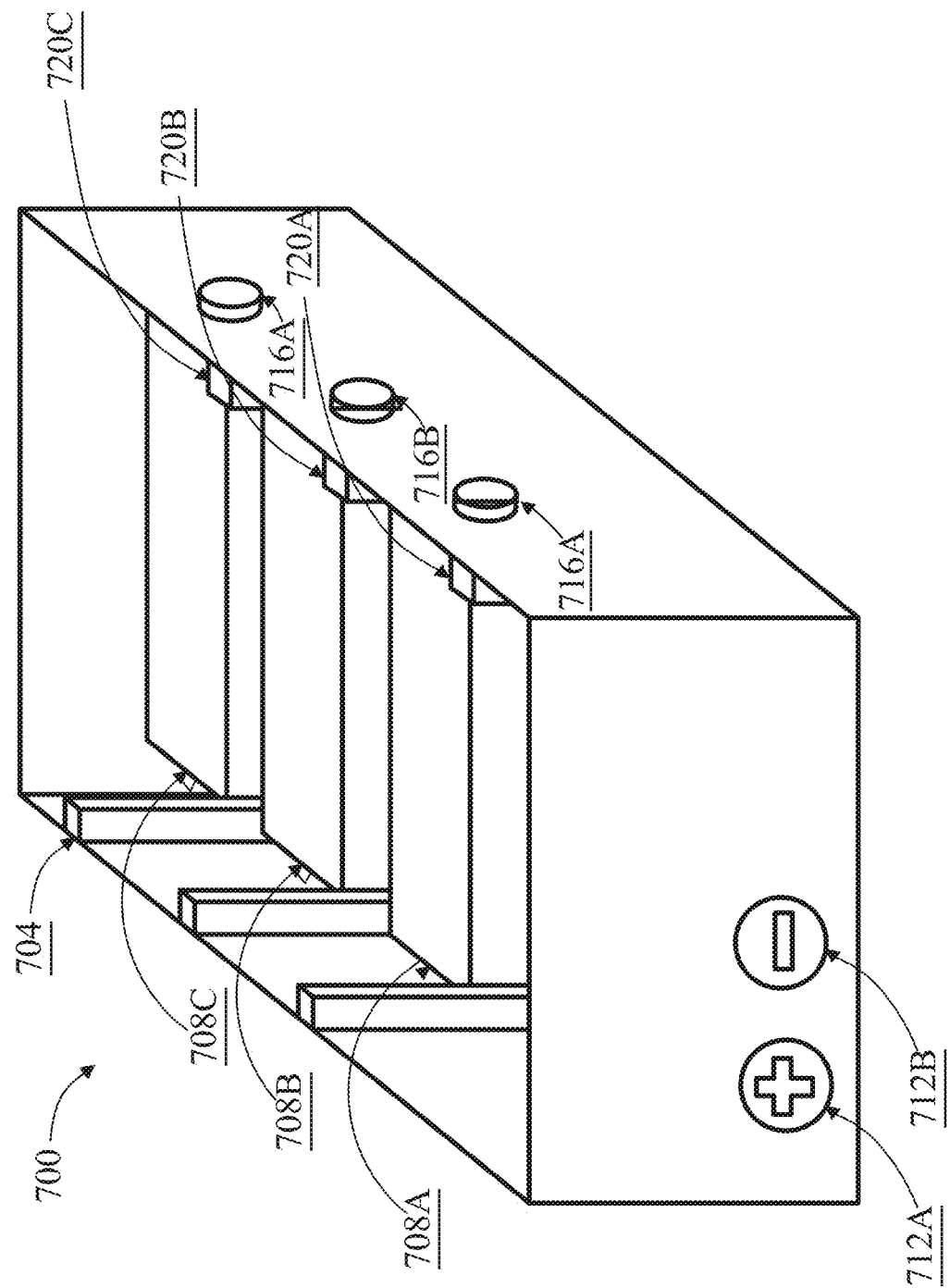
FIG. 7 is a schematic illustration of an exemplary battery pack.

Now referring to FIG. 7, a schematic illustration of another exemplary battery pack 700 is presented. According to some embodiments, battery pack 700 includes an outer case 704. In some cases, case 704 may be made from metal, for example one or more of sheet metal, stamped metal, extruded metal, and/or machined metal. In some cases, case 704 may be formed by way of welding, brazing, and/or soldering. In some cases, case 704 may be composed wholly or in part of a relatively light and strong metal, such as without limitation aluminum alloy. As shown in FIG. 7, case 704, may include an outer case, which may substantially enclose a plurality of battery modules 708A-C. In some versions, case may provide a firewall between flammable battery modules within battery pack and an environment or vehicle surrounding the battery pack.

Continuing in reference to FIG. 7, Battery modules 708A-C may include any battery modules or battery cells described throughout this disclosure, for instance without limitation those described below. Typically, battery modules 708A-C are connected in series to one another, such that a total potential for all of the battery modules together is greater than a potential for any one of the battery modules (e.g., 708A). In some cases, a shared electrical connection from plurality of modules 708A-C may be accessible by way of an electrical connector 712A-B. In some cases, the electrical connector 712A-B may have a polarity and include a positive connection 712A and a negative connection 712B. In some cases, one or more battery modules of plurality of battery modules 708A-C may be mounted to case 704 by way of at least a breakaway mount 716A-C. In some embodiments, a breakaway mount may include any means for attachment that is configured to disconnect under a predetermined load. In some cases, breakaway mounts may be passive and rely upon loading forces for disconnection, such as exemplary breakaway mounts which may include one or more of a shear pin, a frangible nut, a frangible bolt, a breakaway nut, bolt, or stud, and the like. In some cases, a passive breakaway mount may include a relatively soft or brittle material (e.g., plastic) which is easily broken under achievable loads. Alternatively or additionally, a breakaway mount may include a notch, a score line, or another weakening feature purposefully introduced to the mount to introduce breaking at a prescribed load. According to some embodiments, a canted coil spring may be used to as part of a breakaway mount, to ensure that the mount disconnects under a predetermined loading condition. In some cases a mount may comprise a canted coil spring, a housing, and a piston; and sizes and profiles of the housing and the piston may be selected in order to prescribe a force required to disconnect the mount. An exemplary canted coil spring may be provided by Bal-Seal Engineering, Inc. of Foothill Ranch, California, U.S.A. Alternatively or additionally, a breakaway mount may include an active feature which is configured to actively disconnect a mount under a prescribed condition (for instance a rapid change in elevation or large measured G-forces). Much like an airbag that is configured to activate during a crash, an active mount may be configured to actively disconnect during a sensed crash. An active mount may, in some cases, include one or more of an explosive bolt, an explosive nut, an electro-magnetic connection, and the like. In some cases, one or more breakaway mounts 716A-C may be configured to disconnect under a certain loading condition, for instance a force in excess of a predetermined threshold (i.e., battery breakaway force) acting substantially along (e.g., within about) +/−45° a predetermined direction. Non-limiting exemplary battery breakaway forces may include decelerations in excess of 4, 12, 20, 50, or 100 G's.

In some embodiments, case 704 circumscribes an inner volume, which may include a battery storage zone, for instance within which battery modules 708A-C are located, and a crush zone. As a non-limiting example, crush zone may be located between one or more battery modules 708A-C and an inner wall of case 704. In some embodiments, crush zone may be substantially empty. Alternatively, in some other embodiments, crush zone may comprise some material, such as without limitation a compressible material. In some cases, compressible material may be configured to absorb and/or dissipate energy as it is compressed. In some cases, compressible material may include a material having a number of voids; for instance, compressible material may take a form of a honeycomb or another predictably cellular form. Alternatively or additionally, compressible material may include a non-uniform material, such as without limitation a foam. In some embodiments, a crush zone may be located down from one or more battery modules 708A-C substantially along a loading direction, such that for instance the one or more battery modules when disconnected from one or more breakaway mounts 716A-C may be directed toward crush zone. In some cases, case 704 may include one or more channels or guides 720A-C configured to direct at least a battery module 708A-C into a crush zone, should it become disconnected from the case.

Still referring to FIG. 7, in some embodiments, battery module 708A-C may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery modules 708A-C may include lead-based batteries such as without limitation lead acid batteries and lead carbon batteries. Battery modules 708A-C may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, case 704 is constructed in a manner that maximizes manufacturing efficiencies.

Figure 8:
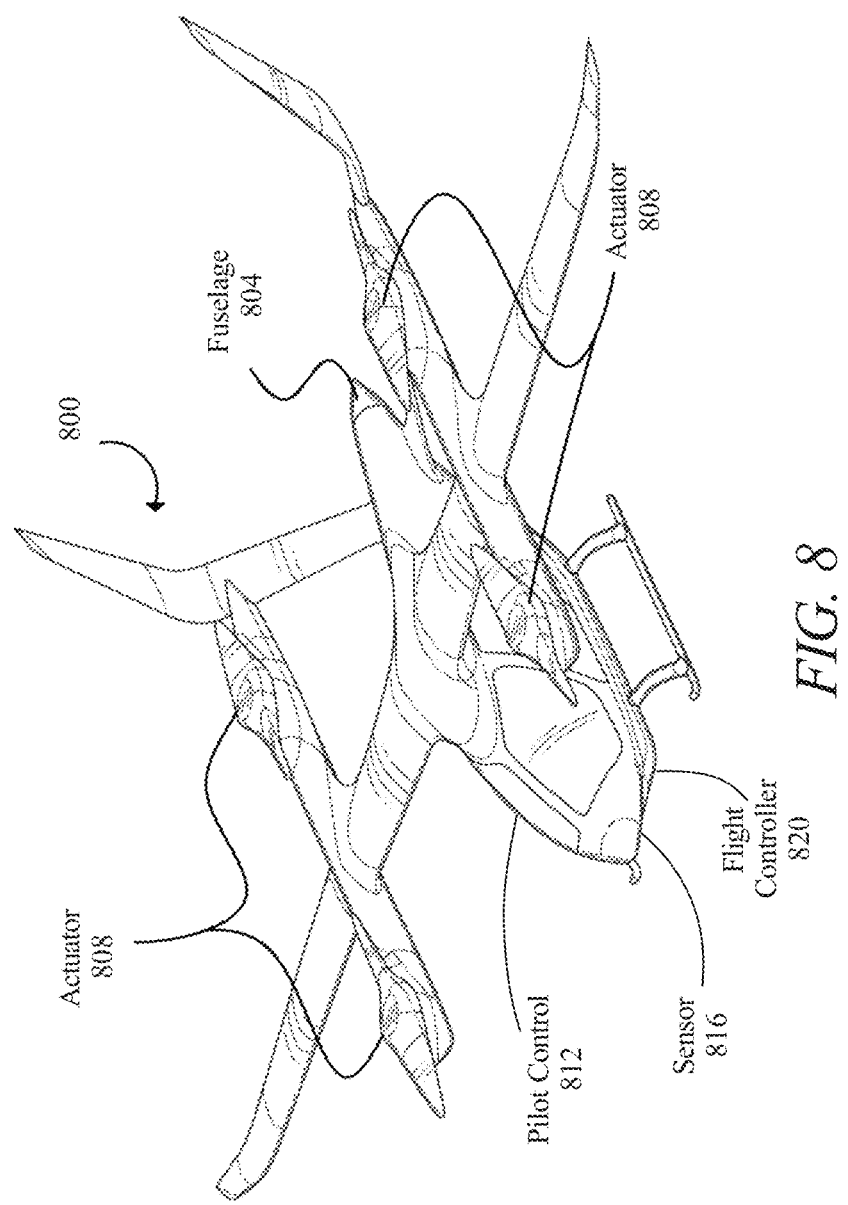
FIG. 8 is a schematic representation of an exemplary electric vertical take-off and landing vehicle.

Referring now to FIG. 8, an exemplary embodiment of an aircraft 800 is illustrated. Aircraft 800 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 8, aircraft 800 may include a fuselage 804. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 804 may comprise structural elements that physically support the shape and structure of an aircraft. Structural elements may take a plurality of forms, alone or in combination with other types. Structural elements may vary depending on the construction type of aircraft and specifically, the fuselage. Fuselage 804 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 8, aircraft 800 may include a plurality of actuators 808. In an embodiment, actuator 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 8, a plurality of actuators 808 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 808 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 808 may include a rudder, which may include, without limitation, a segmented rudder that produces a torque about a vertical axis. Additionally or alternatively, plurality of actuators 808 may include other flight control surfaces such as propulsors, rotating flight controls, or any other structural features which can adjust movement of aircraft 800. Plurality of actuators 808 may include one or more rotors, turbines, ducted fans, paddle wheels, and/or other components configured to propel a vehicle through a fluid medium including, but not limited to air.

Still referring to FIG. 8, plurality of actuators 808 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 8, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 7.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 7.3° inward, wherein propulsor component may be rotated and/or shifted to a second angle of 1.7° outward.

Still referring to FIG. 8, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 8, plurality of actuators 808 may include power sources, control links to one or more elements, fuses, and/or mechanical couplings used to drive and/or control any other flight component. Plurality of actuators 808 may include a motor that operates to move one or more flight control components and/or one or more control surfaces, to drive one or more propulsors, or the like. A motor may be driven by a motor drive, such as without limitation a direct current (DC) electric power and may include, without limitation, brushless DC electric motors, switched reluctance motors, induction motors, or any combination thereof. Alternatively or additionally, a motor drive may include an inverter. A motor drive may also include electronic speed controllers, inverters, or other components for regulating motor speed, rotation direction, and/or dynamic braking.

Still referring to FIG. 8, plurality of actuators 808 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Energy source may include a battery pack. Configuration of an energy source containing connected modules may be designed to meet an energy or power requirement and may be designed to fit within a designated footprint in an electric aircraft in which system may be incorporated.

In an embodiment, and still referring to FIG. 8, an energy source may be used to provide a steady supply of electrical power to a load over a flight by an electric aircraft 800. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 8, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 8, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 8, another exemplary actuator may include landing gear. Landing gear may be used for take-off and/or landing/Landing gear may be used to contact ground while aircraft 800 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 8, aircraft 800 may include a pilot control 812, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 808. For example and without limitation, collective control may alter and/or adjust the pitch angle of all of the main rotor blades collectively. For example, and without limitation pilot control 812 may include a yoke control. As used in this disclosure a "yoke control" is a mechanical control of an aircraft to control the pitch and/or roll. For example and without limitation, yoke control may alter and/or adjust the roll angle of aircraft 800 as a function of controlling and/or maneuvering ailerons. In an embodiment, pilot control 812 may include one or more footbrakes, control sticks, pedals, throttle levels, and the like thereof. In another embodiment, and without limitation, pilot control 812 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 800 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 800 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 8, pilot control 812 may be configured to modify a variable pitch angle. For example, and without limitation, pilot control 812 may adjust one or more angles of attack of a propeller. As used in this disclosure an "angle of attack" is an angle between the chord of the propeller and the relative wind. For example, and without limitation angle of attack may include a propeller blade angled 7.2°. In an embodiment, pilot control 812 may modify the variable pitch angle from a first angle of 2.71° to a second angle of 7.82°. Additionally or alternatively, pilot control 812 may be configured to translate a pilot desired torque for actuator 808. For example, and without limitation, pilot control 812 may translate that a pilot's desired torque for a propeller be 160 lb. ft. of torque. As a further non-limiting example, pilot control 812 may introduce a pilot's desired torque for a propulsor to be 290 lb. ft. of torque.

Additional disclosure related to pilot control 812 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 8, aircraft 800 may include a loading system. A loading system may include a system configured to load an aircraft of either cargo or personnel. For instance, some exemplary loading systems may include a swing nose, which is configured to swing the nose of aircraft 800 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 8, aircraft 800 may include a sensor 816. Sensor 816 may be configured to sense a characteristic of pilot control 812. Sensor may be a device, module, and/or subsystem, utilizing any hardware, software, and/or any combination thereof to sense a characteristic and/or changes thereof, in an instant environment, for instance without limitation a pilot control 812, which the sensor is proximal to or otherwise in a sensed communication with, and transmit information associated with the characteristic, for instance without limitation digitized data. Sensor 816 may be mechanically and/or communicatively coupled to aircraft 800, including, for instance, to at least a pilot control 812. Sensor 816 may be configured to sense a characteristic associated with at least a pilot control 812. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 816 may include at least a geospatial sensor. Sensor 816 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 800 for both critical and non-critical functions. Sensor may be incorporated into vehicle or aircraft or be remote.

Still referring to FIG. 8, in some embodiments, sensor 816 may be configured to sense a characteristic associated with any pilot control described in this disclosure. Non-limiting examples of a sensor 816 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 816 may sense a characteristic as an analog measurement, for instance, yielding a continuously variable electrical potential indicative of the sensed characteristic. In these cases, sensor 816 may additionally comprise an analog to digital converter (ADC) as well as any additional circuitry, such as without limitation a Whetstone bridge, an amplifier, a filter, and the like. For instance, in some cases, sensor 816 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted to other systems within aircraft 800, for instance without limitation a computing system, a pilot display, and a memory component. Alternatively or additionally, sensor 816 may sense a characteristic of a pilot control 812 digitally. For instance in some embodiments, sensor 816 may sense a characteristic through a digital means or digitize a sensed signal natively. In some cases, for example, sensor 816 may include a rotational encoder and be configured to sense a rotational position of a pilot control; in this case, the rotational encoder digitally may sense rotational "clicks" by any known method, such as without limitation magnetically, optically, and the like.

Still referring to FIG. 8, electric aircraft 800 may include at least a motor, which may be mounted on a structural feature of the aircraft. Design of motor may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor may include two main holes in top and bottom of mounting area to access bearing cartridge. Further, a structural feature may include a component of electric aircraft 800. For example, and without limitation structural feature may be any portion of a vehicle incorporating motor, including any vehicle as described in this disclosure. As a further non-limiting example, a structural feature may include without limitation a wing, a spar, an outrigger, a fuselage, or any portion thereof persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least an actuator 808. Persons skilled in the art, upon reviewing the entirety of this disclosure, will be aware of various materials, combinations of materials, and/or constructions techniques.

Still referring to FIG. 8, electric aircraft 800 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 8, a number of aerodynamic forces may act upon the electric aircraft 800 during flight. Forces acting on electric aircraft 800 during flight may include, without limitation, thrust, the forward force produced by the rotating element of the electric aircraft 800 and acts parallel to the longitudinal axis. Another force acting upon electric aircraft 800 may be, without limitation, drag, which may be defined as a rearward retarding force which is caused by disruption of airflow by any protruding surface of the electric aircraft 800 such as, without limitation, the wing, rotor, and fuselage. Drag may oppose thrust and acts rearward parallel to the relative wind. A further force acting upon electric aircraft 800 may include, without limitation, weight, which may include a combined load of the electric aircraft 800 itself, crew, baggage, and/or fuel. Weight may pull electric aircraft 800 downward due to the force of gravity. An additional force acting on electric aircraft 800 may include, without limitation, lift, which may act to oppose the downward force of weight and may be produced by the dynamic effect of air acting on the airfoil and/or downward thrust from the actuator 808 of the electric aircraft. Lift generated by the airfoil may depend on speed of airflow, density of air, total area of an airfoil and/or segment thereof, and/or an angle of attack between air and the airfoil. For example, and without limitation, electric aircraft 800 are designed to be as lightweight as possible. Reducing the weight of the aircraft and designing to reduce the number of components is essential to optimize the weight. To save energy, it may be useful to reduce weight of components of electric aircraft 800, including without limitation propulsors and/or propulsion assemblies. In an embodiment, motor may eliminate need for many external structural features that otherwise might be needed to join one component to another component. Motor may also increase energy efficiency by enabling a lower physical propulsor profile, reducing drag and/or wind resistance. This may also increase durability by lessening the extent to which drag and/or wind resistance add to forces acting on electric aircraft 800 and/or propulsors.

Figure 9:
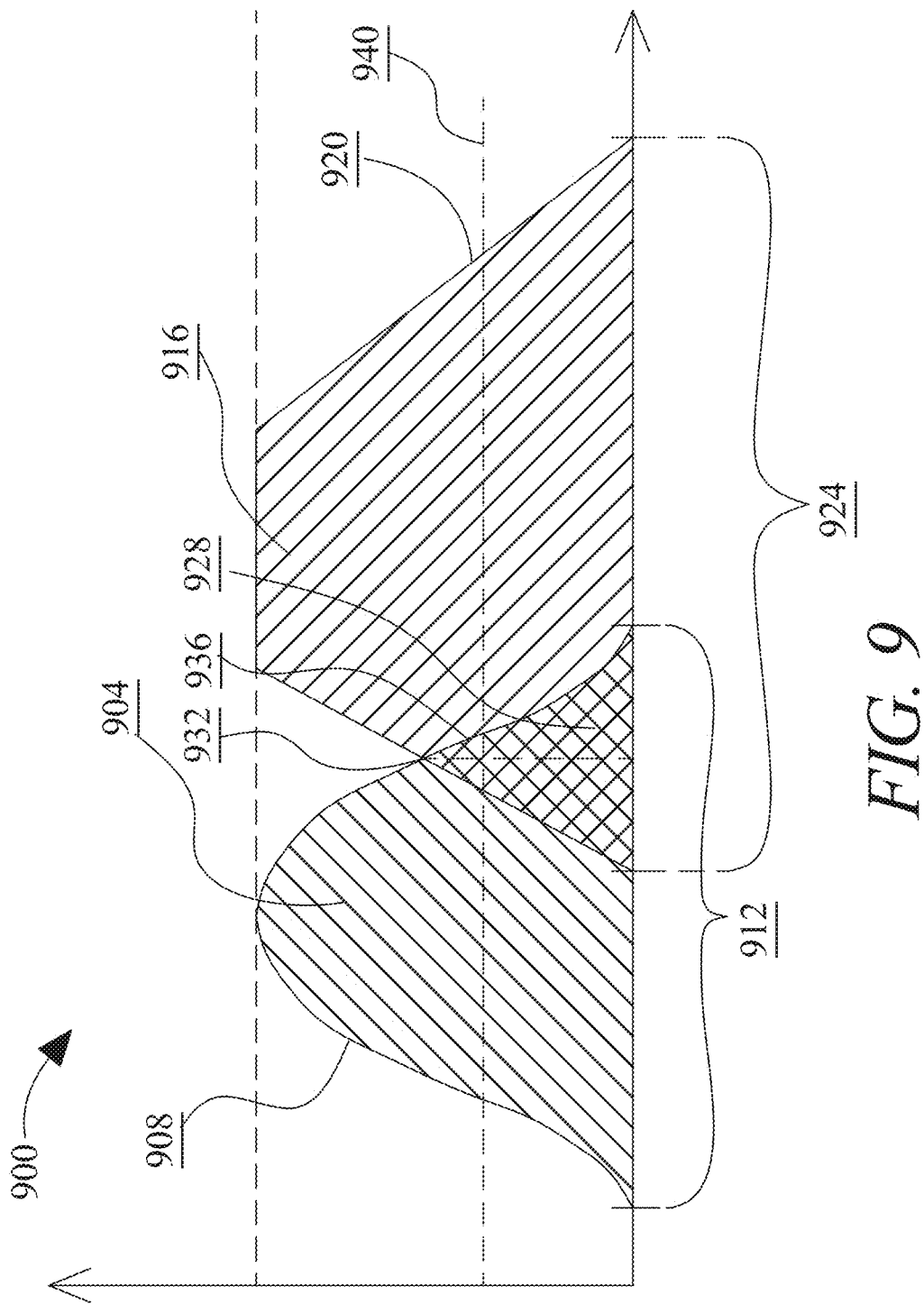
FIG. 9 is an illustration of exemplary embodiments of fuzzy sets for a differential threshold.

Referring now to FIG. 9, a block diagram illustrating exemplary embodiments of fuzzy sets 900 for a differential threshold is presented. A first fuzzy set 904 may be represented, without limitation, according to a first membership function 908 representing a probability that an input falling on a first range of values 912 is a member of the first fuzzy set 904, where the first membership function 908 has values on a range of probabilities such as without limitation the interval [0,1], and an area beneath the first membership function 908 may represent a set of values within first fuzzy set 904. Although first range of values 912 is illustrated for clarity in this exemplary depiction as a range on a single number line or axis, first range of values 912 may be defined on two or more dimensions, representing, for instance, a Cartesian product between a plurality of ranges, curves, axes, spaces, dimensions, or the like. First membership function 808 may include any suitable function mapping first range 912 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \dfrac{x-a}{b-a}, & \text{for } a \leq x < b \\ \dfrac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 904 may represent any value or combination of values as described above, including predictive prevalence value, probabilistic outcome, any resource datum, any niche datum, and/or any combination of the above. A second fuzzy set 916, which may represent any value which may be represented by first fuzzy set 904, may be defined by a second membership function 920 on a second range 924; second range 924 may be identical and/or overlap with first range 912 and/or may be combined with first range via Cartesian product or the like to generate a mapping permitting evaluation overlap of first fuzzy set 904 and second fuzzy set 916. Where first fuzzy set 904 and second fuzzy set 916 have a region 928 that overlaps, first membership function 908 and second membership function 920 may intersect at a point 932 representing a probability, as defined on probability interval, of a match between first fuzzy set 904 and second fuzzy set 916. Alternatively or additionally, a single value of first and/or second fuzzy set may be located at a locus 936 on first range 912 and/or second range 924, where a probability of membership may be taken by evaluation of first membership function 908 and/or second membership function 920 at that range point. A probability at 928 and/or 932 may be compared to a threshold 940 to determine whether a positive match is indicated. Threshold 940 may, in a non-limiting example, represent a degree of match between first fuzzy set 904 and second fuzzy set 916, and/or single values therein with each other or with either set, which is sufficient for purposes of the matching process; for instance, threshold may indicate a sufficient degree of overlap between a battery pack datum including a lower level limit that may include a lower value and/or percentage representing a bottom threshold a comparison between the plurality of battery pack datum must stay above and an upper level limit that may include an upper value and/or percentage representing a top threshold a comparison between the plurality of battery pack datum must not exceed. Each threshold may be determined using training data that correlates the differential threshold and the plurality of comparisons of the plurality of battery pack datum as a function of a machine-learning model.

Still referring to FIG. 9, in an embodiment, a degree of match between fuzzy sets may be used to rank one limit from another of the differential threshold. For instance, a plurality of PMU units may detect a plurality of battery pack datum and a controller may compare the plurality of battery pack datum and output a plurality of differences and/or standard deviation of the plurality of comparisons if one or more comparison results have fuzzy sets closely matching an ideal comparison result which may include a standard deviation of zero by having a degree of overlap exceeding or receding a threshold, wherein the controller may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource that may be presented to a user in order of ranking.

Figure 10:
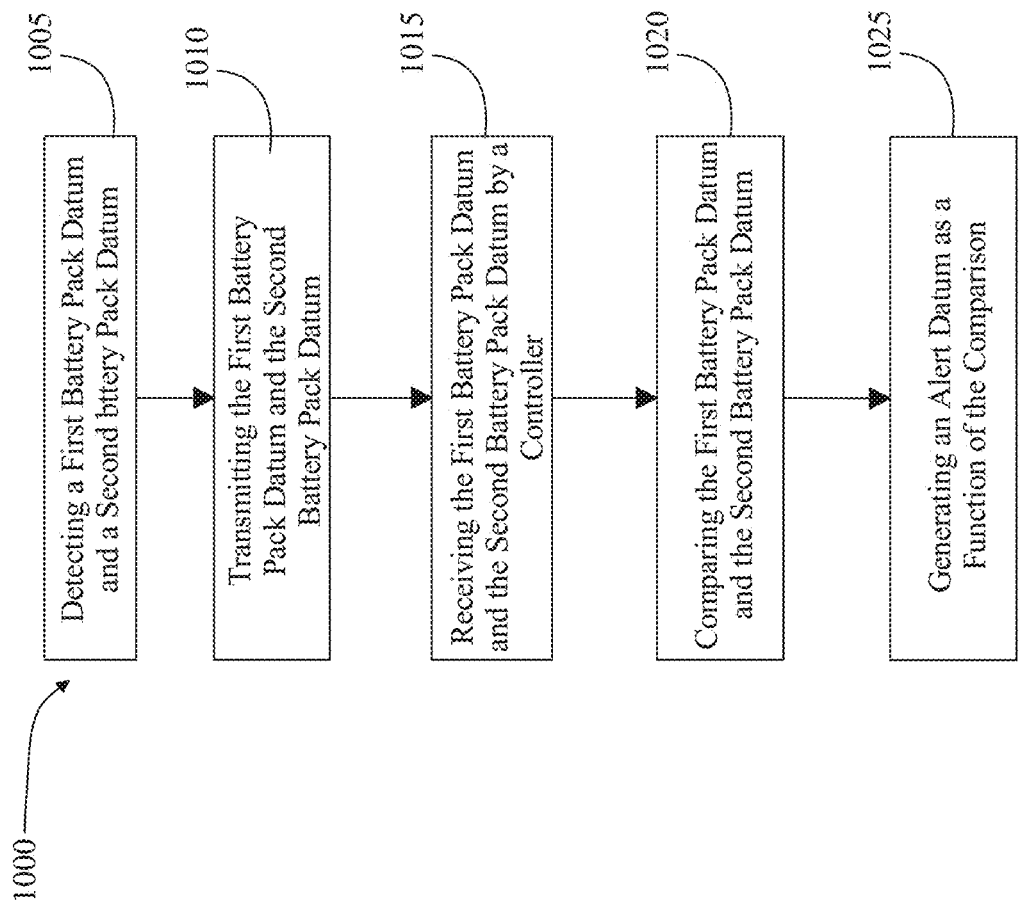
FIG. 10 is a flow diagram of an exemplary embodiment of a method for redundant electric power.

Referring now to FIG. 10, a flow diagram of an exemplary embodiment of a method 900 for redundant electric power is illustrated. Method 1000, at step 1005, includes detecting a first battery pack datum by at least a first pack monitor unit and a second battery pack datum by at least a second pack monitor unit. First battery pack datum may include any first battery pack datum as described herein. Second battery pack datum may include any second battery pack datum as described herein. Pack monitor unit may include any pack monitor as described herein. In a non-limiting embodiment, at least first PMU may be configured to detect a first battery pack datum initially and at least a second PMU may be configured to detect a second battery pack datum after a time interval and/or buffer. For example and without limitation, at least a second PMU may be configured to begin detecting a second battery pack datum ten nanoseconds after the at least a first PMU detects the first battery pack datum. For example and without limitation, at least a second PMU may be configured to begin detecting a second battery pack datum sixty seconds after the at least a first PMU detects the first battery pack datum. In a non-limiting embodiment, the at least a first PMU may be identical to the at least a second PMU. In a non-limiting embodiment, the at least a first PMU and the at least a second PMU may be configured to measure identical targets. In a non-limiting embodiment, the at least first PMU may measure a different datum of a target than the at least a second PMU may measure. In a non-limiting embodiment, the at least a first PMU and/or the at least a second PMU may be used to double check measuring of datum. In a non-limiting embodiment, the at least a first PMU may be configured to detect a first battery pack datum initially and the at least a second PMU may be configured to detect a second battery pack datum after a time interval and/or buffer. For example and without limitation, at least a second PMU may be configured to begin detecting a second battery pack datum ten nanoseconds after the at least a first PMU detects the first battery pack datum. For example and without limitation, the at least a second PMU may be configured to begin detecting a second battery pack datum sixty seconds after the at least a first PMU detects the first battery pack datum.

With continued reference to FIG. 10, method 1000, at step 1010, includes transmitting the first battery pack datum and the second battery pack datum to a controller. Controller may include any controller as described herein. In a non-limiting embodiment, the at least a first PMU may transmit the first battery pack datum to the controller as a function of a first physical CAN bus unit. In a non-limiting embodiment, second PMU 116 may transmit the second battery pack datum to the controller as a function of a second CAN bus unit. Physical CAN bus unit may include any physical CAN bus unit as described herein.

With continued reference to FIG. 10, method 1000, at step 1015, includes receiving, by the controller, the first battery pack datum from the at least a first PMU and the second battery pack datum from the at least a second PMU. In a non-limiting embodiment, controller may be configured to receive the plurality of first and second battery pack datum as a function of the plurality of physical CAN bus units. For example and without limitation, controller may receive the first battery pack datum as a function of the first physical CAN bus unit and receive the second battery pack datum as a function of the second physical CAN bus unit.

With continued reference to FIG. 10, method 1000, at step 1020, includes comparing the first battery pack datum to the second battery pack datum as a function of a differential threshold. The differential threshold may include any differential threshold as described herein. In a non-limiting embodiment, comparing may include using a differential threshold that may include a percentage of 5 percent. For example and without limitation, a comparison of the first battery pack datum and second battery pack datum 120 resulting in a differential of 4 percent means that the comparison falls within the differential threshold. For example and without limitation, a comparison of the first battery pack datum and second battery pack datum 120 resulting in a differential of 10 percent means that the comparison falls out of the differential threshold. In a non-limiting embodiment, differential threshold may include a standard deviation of 0.5 degrees Fahrenheit. For example and without limitation, a comparison may result in a difference of temperature of a battery pack to be 2 degrees Fahrenheit which means that the comparison falls outside of the differential threshold. In a non-limiting embodiment, differential threshold may include an upper threshold value and/or percentage the average of the first battery pack datum and second battery pack datum 120 must not exceed. For example and without limitation, the upper threshold value may include a limit of 120 degrees Fahrenheit. In a non-limiting embodiment, differential threshold may include a lower threshold value and/or percentage the average of the first battery pack datum and second battery pack datum 120 must stay above. For example and without limitation, the lower threshold value may include a lower limit of 40 degrees Fahrenheit. In a non-limiting embodiment, comparing may include retrieving a plurality of first and second battery pack datum from a battery database and comparing the average of the retrieved plurality of battery pack datum with the current plurality of first and second battery pack datum.

With continued reference to FIG. 10, method 1000, at step 1025, includes generating an alert datum as a function of the comparison. Alert datum may include any alert datum as described herein. In a non-limiting embodiment, alert datum may include a plurality of indicators highlighting a phenomenon of a failure, fault, and/or any potentially hazardous event. In a non-limiting embodiment, alert datum may include a plurality of safety measures, safety instructions, maintenance information, and the like thereof. Alert datum may include a plurality of individual alert datums assigned to each battery pack of a plurality of battery packs. In a non-limiting embodiment, alert datum may include a warning sign for each battery pack of the plurality of battery packs that contain a comparison that falls outside of the differential threshold. Alert datum may include a plurality of results of a plurality of comparisons for the plurality of battery packs. For example and without limitation, no battery pack may trigger an alert datum as a function of no battery pack resulting in a comparison that falls outside of the differential threshold in which an alert datum may still be generated to indicate no battery pack 104 is endangered. In a non-limiting embodiment, alert datum may be used to inform a user the health status of each battery pack. In a non-limiting embodiment, alert datum may include a boolean determination. For example and without limitation, alert datum may include an "X" for each battery pack resulting in a comparison that falls outside of the differential threshold and an "O" for each battery pack resulting in a comparison that falls within the differential threshold. In a non-limiting embodiment, alert datum may be transmitted and displayed on a user device. Persons skilled in the art, upon reviewing the entirety of this disclosure, will be aware of the various indicators of a conditional representing the comparison in the form of an alert datum consistent with this disclosure.

With continued reference to FIG. 10, step 1025 may include generating the alert datum as a function of a machine-learning model and at least the controller. Controller may be configured to receive a pair of battery pack datum, wherein the pair comprises the first battery pack datum from the at least a first PMU and the second battery pack datum from the at least a second PMU. Controller may be configured to retrieve a battery pack training set from a battery database, wherein the battery pack training set comprises a previous first battery pack datum and a previous second battery pack datum from a previous instance of storing. Controller may be configured to generate a machine-learning model, wherein the machine-learning model is configured to receive the pair of battery pack datum as an input and output an alert datum as a function of the battery pack training set. In a non-limiting embodiment, controller may compare a plurality of previous battery pack datums to the current plurality of first and second battery pack datums as a function of the differential threshold to generate an alert datum. For example and without limitation, controller may receive the first battery pack datum and second battery pack datum in which the comparison results in an average temperature of a battery pack to be 100 degrees Fahrenheit. The controller may retrieve training data from the battery database which may include a comparison results of a previous iteration, in which the previous iteration occurred at the most recent electric aircraft startup, of a comparison of a pair of first and second battery pack datum to have an average temperature of 80 degrees Fahrenheit. Controller may detect an upward trend and conclude a future iteration resulting in a comparison that results in an average temperature above the upper-level threshold of the differential threshold and generate an alert datum as a function of the prediction of the upward trend. In a non-limiting embodiment, controller may detect a downward trend as a function of the lower-level threshold of the differential threshold in a similar manner as described above. Persons skilled in the art, upon reviewing the entirety of this disclosure, will be aware of the various scenarios of comparing old datum and current datum consistent with this disclosure.

Figure 11:
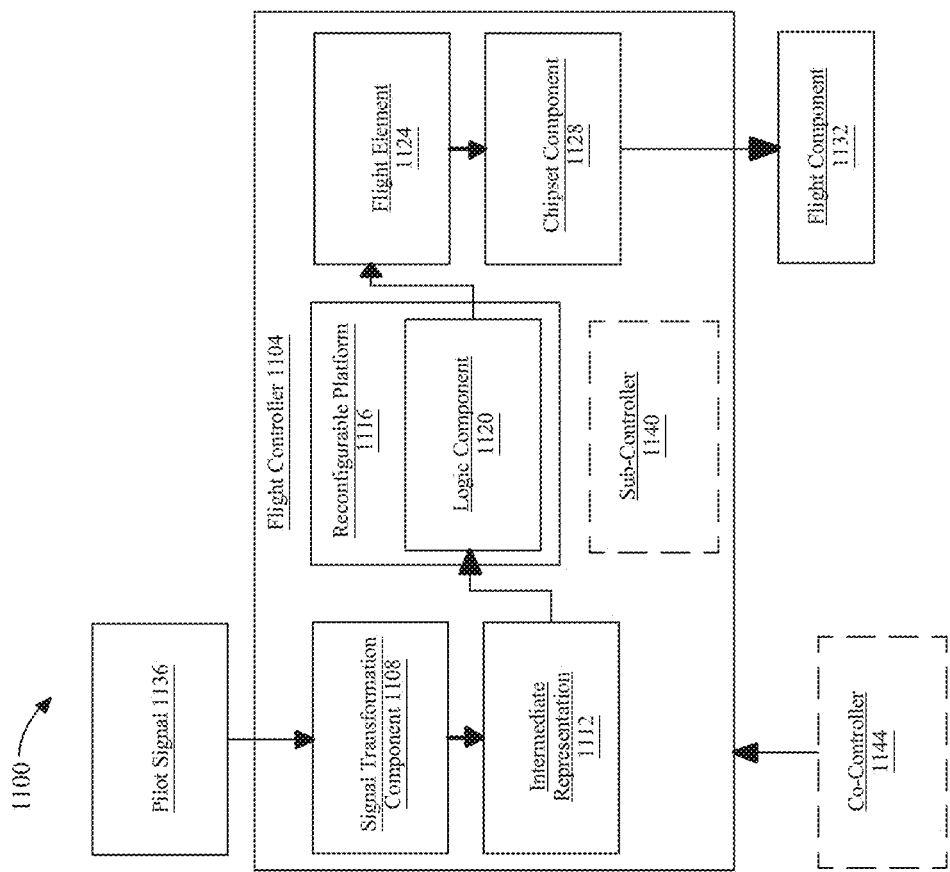
FIG. 11 is a block diagram illustrating an exemplary flight controller.

Now referring to FIG. 11, an exemplary embodiment 1100 of a flight controller 1004 is illustrated. As used in this disclosure a "flight controller" is a computing device of a plurality of computing devices dedicated to data storage, security, distribution of traffic for load balancing, and flight instruction. Flight controller 1104 may include and/or communicate with any computing device as described in this disclosure, including without limitation a microcontroller, microprocessor, digital signal processor (DSP) and/or system on a chip (SoC) as described in this disclosure. Further, flight controller 1104 may include a single computing device operating independently, or may include two or more computing device operating in concert, in parallel, sequentially or the like; two or more computing devices may be included together in a single computing device or in two or more computing devices. In embodiments, flight controller 1004 may be installed in an aircraft, may control the aircraft remotely, and/or may include an element installed in the aircraft and a remote element in communication therewith.

In an embodiment, and still referring to FIG. 11, flight controller 1104 may include a signal transformation component 1108. As used in this disclosure a "signal transformation component" is a component that transforms and/or converts a first signal to a second signal, wherein a signal may include one or more digital and/or analog signals. For example, and without limitation, signal transformation component 1108 may be configured to perform one or more operations such as preprocessing, lexical analysis, parsing, semantic analysis, and the like thereof. In an embodiment, and without limitation, signal transformation component 1108 may include one or more analog-to-digital converters that transform a first signal of an analog signal to a second signal of a digital signal. For example, and without limitation, an analog-to-digital converter may convert an analog input signal to a 10-bit binary digital representation of that signal. In another embodiment, signal transformation component 1108 may include transforming one or more low-level languages such as, but not limited to, machine languages and/or assembly languages. For example, and without limitation, signal transformation component 1108 may include transforming a binary language signal to an assembly language signal. In an embodiment, and without limitation, signal transformation component 1108 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 11, signal transformation component 1108 may be configured to optimize an intermediate representation 1112. As used in this disclosure an "intermediate representation" is a data structure and/or code that represents the input signal. Signal transformation component 1108 may optimize intermediate representation as a function of a data-flow analysis, dependence analysis, alias analysis, pointer analysis, escape analysis, and the like thereof. In an embodiment, and without limitation, signal transformation component 1108 may optimize intermediate representation 1112 as a function of one or more inline expansions, dead code eliminations, constant propagation, loop transformations, and/or automatic parallelization functions. In another embodiment, signal transformation component 1108 may optimize intermediate representation as a function of a machine dependent optimization such as a peephole optimization, wherein a peephole optimization may rewrite short sequences of code into more efficient sequences of code. Signal transformation component 1108 may optimize intermediate representation to generate an output language, wherein an "output language," as used herein, is the native machine language of flight controller 1104. For example, and without limitation, native machine language may include one or more binary and/or numerical languages.

In an embodiment, and without limitation, signal transformation component 1108 may include transforming one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 11, flight controller 1104 may include a reconfigurable hardware platform 1116. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 1116 may be reconfigured to enact any algorithm and/or algorithm selection process received from another computing device and/or created using machine-learning processes.

Still referring to FIG. 11, reconfigurable hardware platform 1116 may include a logic component 1120. As used in this disclosure a "logic component" is a component that executes instructions on output language. For example, and without limitation, logic component may perform basic arithmetic, logic, controlling, input/output operations, and the like thereof. Logic component 1120 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 1120 may be organized according to Von Neumann and/or Harvard architecture as a non-limiting example. Logic component 1120 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 1020 may include one or more integrated circuit microprocessors, which may contain one or more central processing units, central processors, and/or main processors, on a single metal-oxide-semiconductor chip. Logic component 1120 may be configured to execute a sequence of stored instructions to be performed on the output language and/or intermediate representation 1112. Logic component 1120 may be configured to fetch and/or retrieve the instruction from a memory cache, wherein a "memory cache," as used in this disclosure, is a stored instruction set on flight controller 1104. Logic component 1120 may be configured to decode the instruction retrieved from the memory cache to opcodes and/or operands. Logic component 1120 may be configured to execute the instruction on intermediate representation 1112 and/or output language. For example, and without limitation, logic component 1120 may be configured to execute an addition operation on intermediate representation 1112 and/or output language.

In an embodiment, and without limitation, logic component 1120 may be configured to calculate a flight element 1124. As used in this disclosure a "flight element" is an element of datum denoting a relative status of aircraft. For example, and without limitation, flight element 1124 may denote one or more torques, thrusts, airspeed velocities, forces, altitudes, groundspeed velocities, directions during flight, directions facing, forces, orientations, and the like thereof. For example, and without limitation, flight element 1124 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 1124 may denote that aircraft is following a flight path accurately and/or sufficiently.

Still referring to FIG. 11, flight controller 1104 may include a chipset component 1128. As used in this disclosure a "chipset component" is a component that manages data flow. In an embodiment, and without limitation, chipset component 1128 may include a northbridge data flow path, wherein the northbridge dataflow path may manage data flow from logic component 1120 to a high-speed device and/or component, such as a RAM, graphics controller, and the like thereof. In another embodiment, and without limitation, chipset component 1128 may include a southbridge data flow path, wherein the southbridge dataflow path may manage data flow from logic component 1120 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 1128 may manage data flow between logic component 1120, memory cache, and a flight component 1132. As used in this disclosure a "flight component" is a portion of an aircraft that can be moved or adjusted to affect one or more flight elements. For example, flight component 1132 may include a component used to affect the aircrafts' roll and pitch which may comprise one or more ailerons. As a further example, flight component 1132 may include a rudder to control yaw of an aircraft. In an embodiment, chipset component 1128 may be configured to communicate with a plurality of flight components as a function of flight element 1124. For example, and without limitation, chipset component 1128 may transmit to an aircraft rotor to reduce torque of a first lift propulsor and increase the forward thrust produced by a pusher component to perform a flight maneuver.

In an embodiment, and still referring to FIG. 11, flight controller 1104 may be configured to generate an autonomous function. As used in this disclosure an "autonomous function" is a mode and/or function of flight controller 1104 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 1124. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 1104 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 1104 will control the ailerons and/or rudders. As used in this disclosure "non-autonomous mode" is a mode that denotes a pilot will control aircraft and/or maneuvers of aircraft in its entirety.

In an embodiment, and still referring to FIG. 11, flight controller 1104 may generate autonomous function as a function of an autonomous machine-learning model. As used in this disclosure an "autonomous machine-learning model" is a machine-learning model to produce an autonomous function output given flight element 1124 and a pilot signal 1136 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 1136 may denote that a pilot is controlling and/or maneuvering ailerons, wherein the pilot is not in control of the rudders and/or propulsors. In an embodiment, pilot signal 1136 may include an implicit signal and/or an explicit signal. For example, and without limitation, pilot signal 1136 may include an explicit signal, wherein the pilot explicitly states there is a lack of control and/or desire for autonomous function. As a further non-limiting example, pilot signal 1136 may include an explicit signal directing flight controller 1104 to control and/or maintain a portion of aircraft, a portion of the flight plan, the entire aircraft, and/or the entire flight plan. As a further non-limiting example, pilot signal 1136 may include an implicit signal, wherein flight controller 1104 detects a lack of control such as by a malfunction, torque alteration, flight path deviation, and the like thereof. In an embodiment, and without limitation, pilot signal 1136 may include one or more explicit signals to reduce torque, and/or one or more implicit signals that torque may be reduced due to reduction of airspeed velocity. In an embodiment, and without limitation, pilot signal 1136 may include one or more local and/or global signals. For example, and without limitation, pilot signal 1136 may include a local signal that is transmitted by a pilot and/or crew member. As a further non-limiting example, pilot signal 1136 may include a global signal that is transmitted by air traffic control and/or one or more remote users that are in communication with the pilot of aircraft. In an embodiment, pilot signal 1136 may be received as a function of a tri-state bus and/or multiplexor that denotes an explicit pilot signal should be transmitted prior to any implicit or global pilot signal.

Still referring to FIG. 11, autonomous machine-learning model may include one or more autonomous machine-learning processes such as supervised, unsupervised, or reinforcement machine-learning processes that flight controller 1104 and/or a remote device may or may not use in the generation of autonomous function. As used in this disclosure "remote device" is an external device to flight controller 1104. Additionally or alternatively, autonomous machine-learning model may include one or more autonomous machine-learning processes that a field-programmable gate array (FPGA) may or may not be used in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 11, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 1104 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 11, flight controller 1104 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 1104. Remote device and/or FPGA may transmit a signal, bit, datum, or parameter to flight controller 1104 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 1104 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 11, flight controller 1104 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 11, flight controller 1104 may include, but is not limited to, for example, a cluster of flight controllers in a first location and a second flight controller or cluster of flight controllers in a second location. Flight controller 1104 may include one or more flight controllers dedicated to data storage, security, distribution of traffic for load balancing, and the like. Flight controller 1104 may be configured to distribute one or more computing tasks as described below across a plurality of flight controllers, which may operate in parallel, in series, redundantly, or in any other manner used for distribution of tasks or memory between computing devices. For example, and without limitation, flight controller 1104 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 11, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 1132. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 11, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 1104. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 1112 and/or output language from logic component 1120, wherein output language may include one or more analog-to-digital conversions, low bit rate transmissions, message encryptions, digital signals, binary signals, logic signals, analog signals, and the like thereof described above in detail.

Still referring to FIG. 11, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 11, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 11, flight controller 1104 may also be implemented using a "shared nothing" architecture in which data is cached at the worker, in an embodiment, this may enable scalability of aircraft and/or computing device. Flight controller 1104 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, a node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 11, flight controller may include a sub-controller 1140. As used in this disclosure a "sub-controller" is a controller and/or component that is part of a distributed controller as described above; for instance, flight controller 1104 may be and/or include a distributed flight controller made up of one or more sub-controllers. For example, and without limitation, sub-controller 1140 may include any controllers and/or components thereof that are similar to distributed flight controller and/or flight controller as described above. Sub-controller 1140 may include any component of any flight controller as described above. Sub-controller 1140 may be implemented in any manner suitable for implementation of a flight controller as described above. As a further non-limiting example, sub-controller 1140 may include one or more processors, logic components and/or computing devices capable of receiving, processing, and/or transmitting data across the distributed flight controller as described above. As a further non-limiting example, sub-controller 1140 may include a controller that receives a signal from a first flight controller and/or first distributed flight controller component and transmits the signal to a plurality of additional sub-controllers and/or flight components.

Still referring to FIG. 11, flight controller may include a co-controller 1144. As used in this disclosure a "co-controller" is a controller and/or component that joins flight controller 1104 as components and/or nodes of a distributer flight controller as described above. For example, and without limitation, co-controller 1144 may include one or more controllers and/or components that are similar to flight controller 1104. As a further non-limiting example, co-controller 1144 may include any controller and/or component that joins flight controller 1104 to distributer flight controller. As a further non-limiting example, co-controller 1144 may include one or more processors, logic components and/or computing devices capable of receiving, processing, and/or transmitting data to and/or from flight controller 1104 to distributed flight control system. Co-controller 1144 may include any component of any flight controller as described above. Co-controller 1144 may be implemented in any manner suitable for implementation of a flight controller as described above.

In an embodiment, and with continued reference to FIG. 11, flight controller 1104 may be designed and/or configured to perform any method, method step, or sequence of method steps in any embodiment described in this disclosure, in any order and with any degree of repetition. For instance, flight controller 1104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 12:
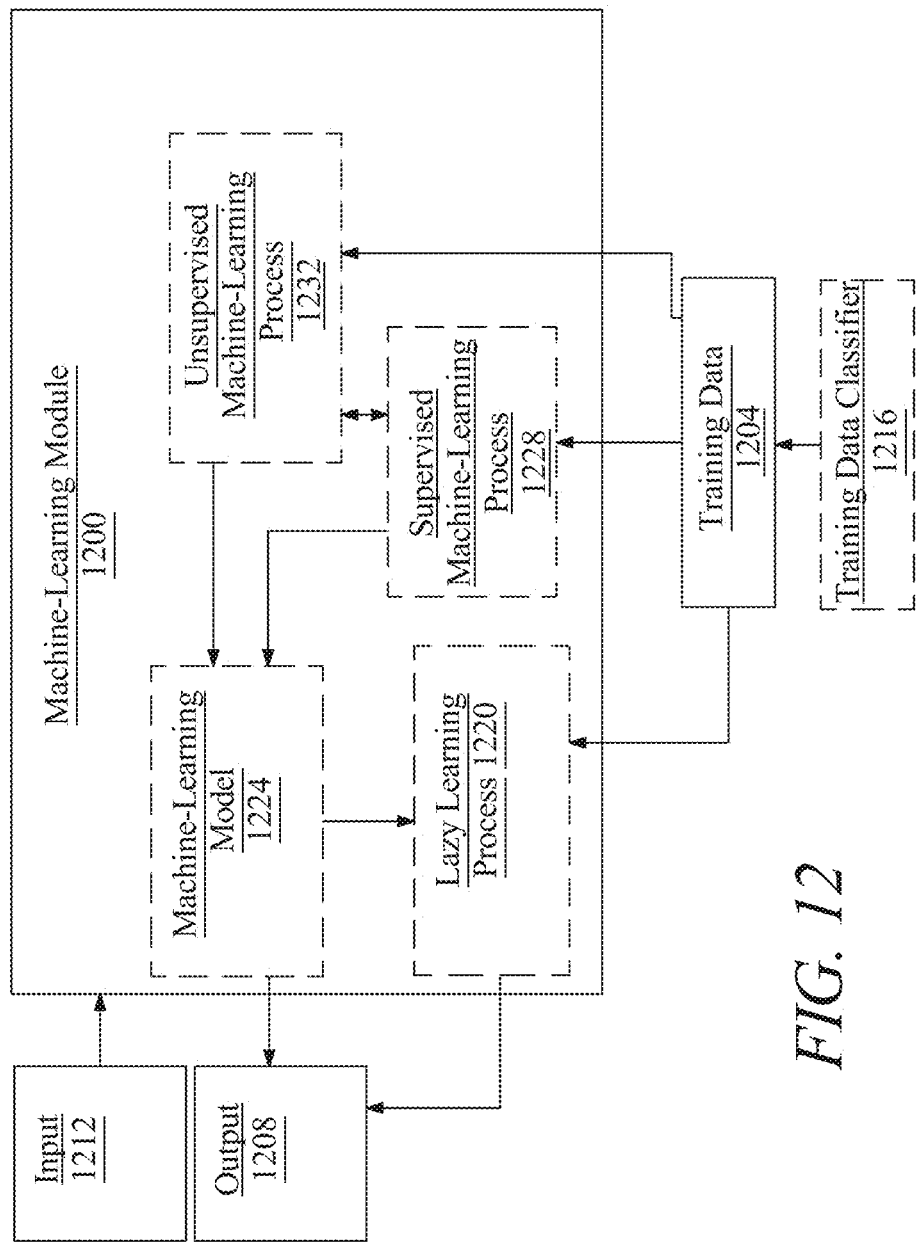
FIG. 12 illustrates a block diagram of an exemplary machine-learning process.

Referring now to FIG. 12, an exemplary embodiment of a machine-learning module 1200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1204 to generate an algorithm that will be performed by a computing device/module to produce outputs 1208 given data provided as inputs 1212; this is in contrast to a non-machine learning software program where the commands to be executed are determined in advance by a user and written in a programming language.

Still referring to FIG. 12, "training data," as used herein, is data containing correlations that a machine-learning process may use to model relationships between two or more categories of data elements. For instance, and without limitation, training data 1204 may include a plurality of data entries, each entry representing a set of data elements that were recorded, received, and/or generated together; data elements may be correlated by shared existence in a given data entry, by proximity in a given data entry, or the like. Multiple data entries in training data 1204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1204 according to various correlations; correlations may indicate causative and/or predictive links between categories of data elements, which may be modeled as relationships such as mathematical relationships by machine-learning processes as described in further detail below. Training data 1204 may be formatted and/or organized by categories of data elements, for instance by associating data elements with one or more descriptors corresponding to categories of data elements. As a non-limiting example, training data 1204 may include data entered in standardized forms by persons or processes, such that entry of a given data element in a given field in a form may be mapped to one or more descriptors of categories. Elements in training data 1204 may be linked to descriptors of categories by tags, tokens, or other data elements; for instance, and without limitation, training data 1204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 12, training data 1204 may include one or more elements that are not categorized; that is, training data 1204 may not be formatted or contain descriptors for some elements of data. Machine-learning algorithms and/or other processes may sort training data 1204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1204 to be made applicable for two or more distinct machine-learning algorithms as described in further detail below. Training data 1204 used by machine-learning module 1200 may correlate any input data as described in this disclosure to any output data as described in this disclosure. As a non-limiting illustrative example, first battery pack datum and second battery pack datum may be inputs and alert datum may be an output.

Further referring to FIG. 12, training data may be filtered, sorted, and/or selected using one or more supervised and/or unsupervised machine-learning processes and/or models as described in further detail below; such models may include without limitation a training data classifier 1216. Training data classifier 1216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1200 may generate a classifier using a classification algorithm, defined as a processes whereby a computing device and/or any module and/or component operating thereon derives a classifier from training data 1204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1216 may classify elements of training data to categorize a plurality of battery packs as a function of various classifications of level of severity deviating from a standard deviation for which a subset of training data may be selected.

Still referring to FIG. 12, machine-learning module 1200 may be configured to perform a lazy-learning process 1220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1204. Heuristic may include selecting some number of highest-ranking associations and/or training data 1204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 12, machine-learning processes as described in this disclosure may be used to generate machine-learning models 1224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1224 may be generated by creating an artificial neural network, such as a convolutional neural network comprising an input layer of nodes, one or more intermediate layers, and an output layer of nodes. Connections between nodes may be created via the process of "training" the network, in which elements from a training data 1204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 12, machine-learning algorithms may include at least a supervised machine-learning process 1228. At least a supervised machine-learning process 1228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include first battery pack datum and second battery pack datum as inputs, alert datum as an output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1204. Persons skilled in the art, upon reviewing the entirety of this disclosure, will be aware of various possible variations of at least a supervised machine-learning process 1228 that may be used to determine relation between inputs and outputs. Supervised machine-learning processes may include classification algorithms as defined above.

Further referring to FIG. 12, machine learning processes may include at least an unsupervised machine-learning processes 1232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 12, machine-learning module 1200 may be designed and configured to create a machine-learning model 1224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 12, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
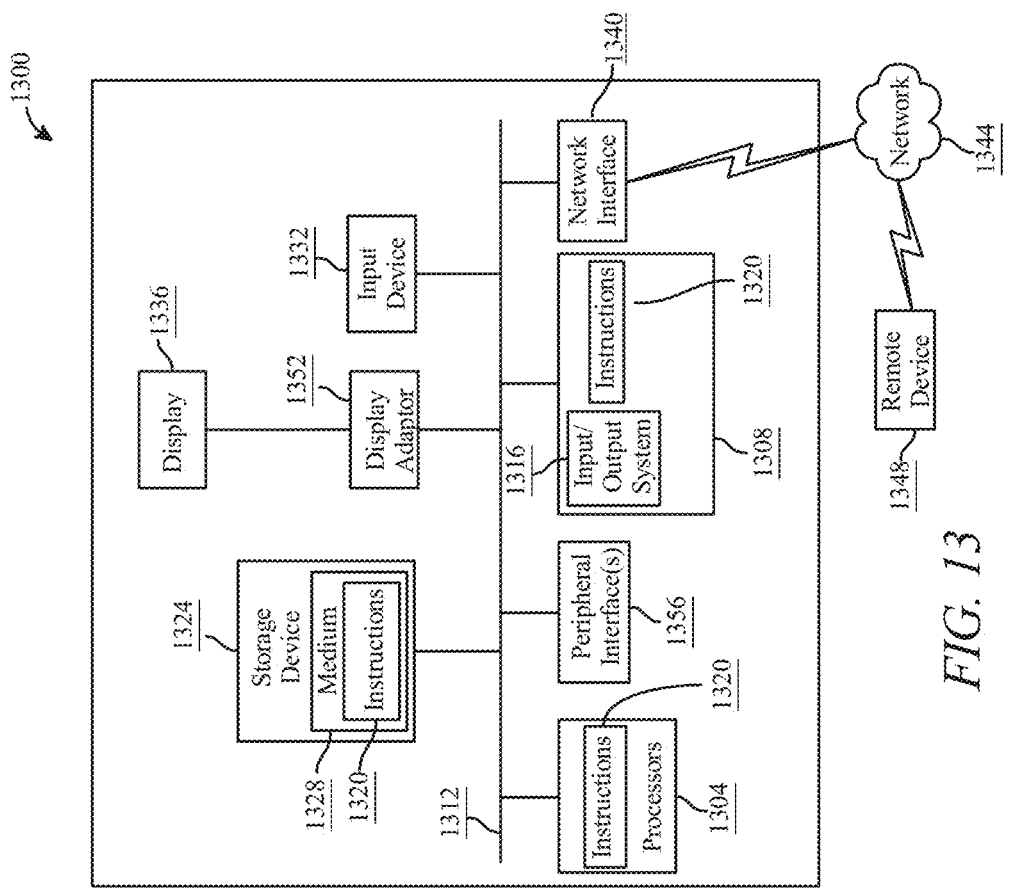
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and/or software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for redundant electric power for an electric aircraft, the system comprising:
    a battery pack, wherein the battery pack comprises:
        at least a first pack monitor unit, wherein the at least a first pack monitor unit comprises a first sensor suite, wherein the at least a first pack monitor unit is configured to:
            detect a first battery pack datum of the battery pack as a function of the first sensor suite;
        at least a second pack monitor unit, wherein the at least a second pack monitor unit comprises a second sensor suite wherein the at least a second pack monitor unit is configured to:
            detect a second battery pack datum of the battery pack as a function of the second sensor suite;
    a battery management system, wherein the battery management system is configured to:
        receive the first battery pack datum from the at least a first pack monitor unit;
        receive the second battery pack datum from the at least a second pack monitor unit; and
        compare the first battery pack datum to the second battery pack datum as a function of a threshold value;
    a contactor coupled to the electric aircraft; and
    at least a load electrically coupled to the battery pack.

2. The system of claim 1, wherein the battery management system is further configured to generate an alert datum as a function of the comparison between the first battery pack datum and the second battery pack datum.

3. The system of claim 1, wherein the battery management system is configured to control one or more actions of the contactor as a function of an aircraft high voltage ring bus.

4. The system of claim 1, wherein the contactor comprises at least a load switch.

5. The system of claim 1, wherein the first battery pack datum comprises information describing a voltage of the battery pack.

6. The system of claim 1, wherein the first sensor suite comprises at least a temperature sensor.

7. The system of claim 1, wherein the battery management system is further configured to store the first battery pack datum and the second battery pack datum in a battery database.

8. The system of claim 1, wherein the battery pack further comprises a plurality of battery cells aligned in parallel.

9. The system of claim 1, wherein the battery pack further comprises a plurality of battery cells aligned in series.

10. The system of claim 2, wherein the alert datum is transmitted and displayed on a user device.

11. A method for redundant electric power for an electric aircraft, the method comprising:
   detecting a first battery pack datum of a battery pack using at least a first pack monitor unit comprising a first sensor suite;
   detecting a second battery pack datum of the battery pack using at least a second pack monitor unit comprising a second sensor suite;
   receiving, by a battery management system, the first battery pack datum from the at least a first battery pack monitor and the second battery pack datum from the at least a second pack monitor unit; and
   comparing the first battery pack datum to the second battery pack datum as a function of a threshold value.

12. The method of claim 11, further comprising generating, by the battery management system, an alert datum as a function of the comparison between the first battery pack datum and the second battery pack datum.

13. The method of claim 11, further comprising controlling, by the battery management system, one or more actions of a contactor coupled to the electric aircraft as a function of an aircraft high voltage ring bus.

14. The method of claim 13, wherein the contactor includes at least a load switch.

15. The method of claim 11, wherein the first battery pack datum comprises information describing a voltage of battery pack.

16. The method of claim 11, wherein the first sensor suite comprises at least a temperature sensor.

17. The method of claim 11, further comprising storing, by the battery management system, the first battery pack datum and the second battery pack datum on a battery database.

18. The method of claim 11, wherein the battery pack further comprises a plurality of battery cells aligned in parallel.

19. The method of claim 12, further comprising:
   transmitting, by the battery management system, the alert datum to a user device, wherein the alert datum is displayed on the user device.

20. The method of claim 11, wherein the battery pack comprises a load electrically coupled to the battery pack.

* * * * *